(12) United States Patent
McGough

(10) Patent No.: US 8,144,875 B2
(45) Date of Patent: *Mar. 27, 2012

(54) METHOD AND SYSTEM FOR ESTABLISHING REAL-TIME AUTHENTICATED AND SECURED COMMUNICATIONS CHANNELS IN A PUBLIC NETWORK

(75) Inventor: R. Paul McGough, Centreville, VA (US)

(73) Assignee: Paul McGough, Centreville, VA (US)

( * ) Notice: Subject to any disclaimer, the term of this patent is extended or adjusted under 35 U.S.C. 154(b) by 1155 days.

This patent is subject to a terminal disclaimer.

(21) Appl. No.: 11/899,742

(22) Filed: Sep. 6, 2007

(65) Prior Publication Data
US 2008/0065886 A1   Mar. 13, 2008

Related U.S. Application Data

(60) Provisional application No. 60/842,595, filed on Sep. 6, 2006.

(51) Int. Cl.
*H04L 9/00* (2006.01)

(52) U.S. Cl. ........ 380/277; 280/278; 280/279; 280/280; 705/51; 705/54; 705/57; 709/227; 709/228; 713/156; 713/168; 713/175; 713/176; 713/150; 713/177; 713/171

(58) Field of Classification Search .................. 713/168
See application file for complete search history.

(56) References Cited

U.S. PATENT DOCUMENTS

| | | |
|---|---|---|
| 4,675,477 A | 6/1987 | Thornwall |
| 4,797,921 A | 1/1989 | Shiraishi |
| 5,164,986 A | 11/1992 | Bright |
| 5,297,207 A | 3/1994 | Degele |
| 5,602,917 A | 2/1997 | Mueller |
| 5,657,390 A | 8/1997 | Elgamal et al. |
| 5,796,830 A | 8/1998 | Johnson et al. |
| 5,825,890 A | 10/1998 | Elgamal et al. |
| 5,832,087 A | 11/1998 | Hawthorne |
| 6,002,769 A | 12/1999 | McGough |
| 6,035,402 A | 3/2000 | Vaeth et al. |
| 6,041,123 A | 3/2000 | Colvin, Sr. |
| 6,058,189 A | 5/2000 | McGough |
| 6,269,164 B1 | 7/2001 | Pires |
| 6,308,277 B1 | 10/2001 | Vaeth et al. |
| 6,415,032 B1 | 7/2002 | Doland |
| 6,445,797 B1 | 9/2002 | McGough |
| 6,732,271 B1 | 5/2004 | Sako et al. |
| 6,891,950 B1 | 5/2005 | Oomori et al. |
| 6,983,382 B1 | 1/2006 | Hartke et al. |

(Continued)

*Primary Examiner* — Nathan Flynn
*Assistant Examiner* — Bryan Wright
(74) *Attorney, Agent, or Firm* — Michael P. Fortkort, Esq.

(57) ABSTRACT

A system and method comprising a computer useable medium having computer readable program code embodied therein for authenticating and encrypting and decrypting information transferred over a public network between a client application program running in a client computer and a server application program running in a server computer and a directory service application program running in a server computer. A method for secure communication by a processor with a server includes generating a message to the server by employing a one pass key generation probabilistic authentication process using a predetermined session master key and sending the message to the server. A method for secure communication between an application executable on a computer and a web server coupled to the computer includes participating by the application in an initial authentication process with the server and wrapping every GET and POST request message to the server in an SSLX-EA exchange after the initial authentication process.

29 Claims, 10 Drawing Sheets

U.S. PATENT DOCUMENTS

| | | |
|---|---|---|
| 7,111,162 B1 | 9/2006 | Bagepalli et al. |
| 2002/0039420 A1* | 4/2002 | Shacham et al. ............... 380/277 |
| 2002/0196935 A1* | 12/2002 | Wenocur et al. ................ 380/37 |
| 2005/0038914 A1* | 2/2005 | Prendergast et al. ......... 709/250 |
| 2006/0085546 A1* | 4/2006 | Abdo et al. .................... 709/227 |
| 2008/0056501 A1* | 3/2008 | McGough .................... 380/281 |

* cited by examiner

METHOD AND SYSTEM FOR ESTABLISHING REAL-TIME AUTHENTICATED AND SECURED COMMUNICATIONS CHANNELS IN A PUBLIC NETWORK

RELATED APPLICATION

This application claims the benefit of U.S. Provisional Application No. 60/842,595 filed Sep. 6, 2006 by the same inventor.

FIELD OF THE INVENTION

The present invention relates generally to systems and methods for conducting communications over networks, and more particularly to a system and method for conducting communications securely over a public network or via any communication link.

BACKGROUND OF THE INVENTION

Whereas great strides have been made in the security of public networks, there is one totally neglected aspect: public scrutiny. In a public network, the procedure for creating a private, secure channel within the public architecture is well defined. The procedure involves the provision of trust brokered between two unique parties by a trusted third party. The technologies and methods for provision of this trust rely exclusively on the mathematic formulation of exchanged information. While these methods are currently viewed as being difficult with which to interfere, the concept of being able to publicly check on the provision of the information is completely lacking.

There is no easy, public way to "check the badge number" of the electronic "police officer" showing it to you. There is no way to scrutinize the trusted third party provider of the electronic exchange information or scrutinize the conditions under which they became a provider. In essence, there is no easy publicly verifiable method or technology that can be used in real-time to verify and validate the mathematic information presentation to be certain that the security and privacy of the connection is as created.

The present invention is therefore directed to the problem of developing a method and apparatus for communicating securely over a public network that does not rely on self-authentication of a trusted third party.

SUMMARY OF THE INVENTION

The present invention solves these and other problems by providing a novel mathematic exchange technique within a novel trust model.

According to one aspect, the present invention relates to systems and methods for the secure exchange of numeric authentication and encryption keys and for authenticated encryption of any accompanying message content. An exemplary embodiment of the method is applied at the socket layer of the network, and is an improvement on the commonly referred to Secure Sockets Layer (SSL) and Transport Layer Security (TLS) technology. The inventor terms the new method of the present invention, Secure Sockets Layer eXtended (SSLX), which method is several hundred times faster delivering a single-pass handshake and per transmission session key generation and use.

The performance improvement allows a trusted third party to function not only as a provider of initial authentication information to network participants but also as a provider in real-time of new authentication and encryption key information between the participants per session. This completely re-aligns the provision of third party trust from reliance on the static, unchanging-for-years initial authentication information and its mathematic presentation as currently offered by SSL/TLS, to the ability of participants to validate trust tokens in real-time at any time during their connection. Public scrutiny is the linchpin of global society and the lack of it in the electronic world is a stifling hindrance to new frontiers.

According to one aspect of the present invention, a method for secure communication by a processor with a server includes generating a message to the server by employing a one pass key generation probabilistic authentication process using a predetermined session master key and sending the message to the server. The message includes a random number used by the processor in the one pass key generation probabilistic authentication process. A reply from the server includes a second random number, which reply was generated by the server by employing the one pass key generation probabilistic authentication process using a predetermined session master key and the second random number. Upon receipt of the reply, the processor generates a message key to decrypt the reply using the second random number and a same predetermined session master key used by the server to create the reply. The generating and sending steps are performed even after an initial authentication process involving the processor and server.

According to another aspect of the present invention, a method for secure communication by a processor with a server includes generating a message key from a random number and a master key and employing the message key to encrypt a request to the server. The encrypted request and the random number are then sent to the server.

According to another aspect of the present invention, the message key is formed by combining the random number and the master key and then selecting a subset of the combined random number and the master key.

According to another aspect of the present invention, a method for secure communication between an application executable on a computer and a web server coupled to the computer includes participating by the application in an initial authentication process with the server and wrapping every GET and POST request message to the server in an SSLX-EA exchange after the initial authentication process. A setting on the server is provided that defines an SSLX-EA session length. One possible setting for an SSLX session length in a web architecture comprises one HTML page so that each page will have a unique session master key exchange and message key to include the request and reply of all objects on each page.

According to another aspect of the present invention, a method for secure communication by a server with a processor includes generating a reply to the processor by employing a one pass key generation probabilistic authentication process using a predetermined session master key and sending the reply to the server. The reply includes a random number used by the server in the one pass key generation probabilistic authentication process. A request received from the processor includes a second random number, which request was generated by the processor by employing the one pass key generation probabilistic authentication process using a predetermined session master key and the second random number. The server generates a message key to decrypt the request using the second random number and a same predetermined session master key used by the processor to create the request.

The above generating and sending steps are performed even after an initial authentication process involving the processor and server.

According to another aspect of the present invention, a method for secure communication by a server with a processor includes generating a message key from a random number and a master key and employing the message key to encrypt a reply to the processor. The server sends an encrypted reply and the random number to the processor.

According to another aspect of the present invention, a method for secure communication between an application executable on a computer and a web server coupled to the computer includes participating by the server in an initial authentication process with the application and wrapping every reply to every received GET and POST request message from the application in an SSLX-EA exchange after the initial authentication process. A setting on the server is provided that defines an SSLX-EA session length. One possible setting for an SSLX session length in a web architecture comprises one HTML page so that each page will have a unique session master key exchange and message key to include the request and reply of all objects on each page.

According to another aspect of the present invention, a method for communicating between a program executing on a processor and a server coupled to the processor includes performing an initial authentication process of authenticating the server to the program and authenticating the program to the server and authenticating and encrypting each message between the server and the application after performing the initial authentication process. The authenticating and encrypting may include employing a one pass key generation probabilistic authentication process to create every GET and POST request message from the program to the server using a predetermined session master key and a unique random number included with every GET and POST request message. The authenticating and encrypting may also include employing a one pass key generation probabilistic authentication process to create every reply from the server using a predetermined session master key and a unique random number included with every reply.

According to another aspect of the present invention, a method for communicating between a computer and a server includes, during each session of communication between the computer and the server, wrapping each request by the computer in an SSLX-EA key exchange and ciphertext at a start of the session and sending each wrapped request to the server and wrapping each request by the computer in cipher text only (e.g., encrypting the request) if not at the start of a session and sending each wrapped request to the server. The server then unwraps the SSLX-EA key exchange and decrypts the request if at the start of the session, or merely decrypts the request only if not at the start of the session. The server then wraps a reply in an SSLX-EA key exchange if a session length is set for every communication, or wraps the reply in cipher text only using the session key if the session length has not been exceeded. The server then returns a reply to the computer. The computer unwraps the reply and performs an SSLX-EA key exchange decrypt or a cipher decrypt only based on the session length setting.

These and other features and advantages of the present invention will become more apparent from the following description of exemplary embodiments thereof, as illustrated in the accompanying drawings.

DETAILED DESCRIPTION

Figure 1:
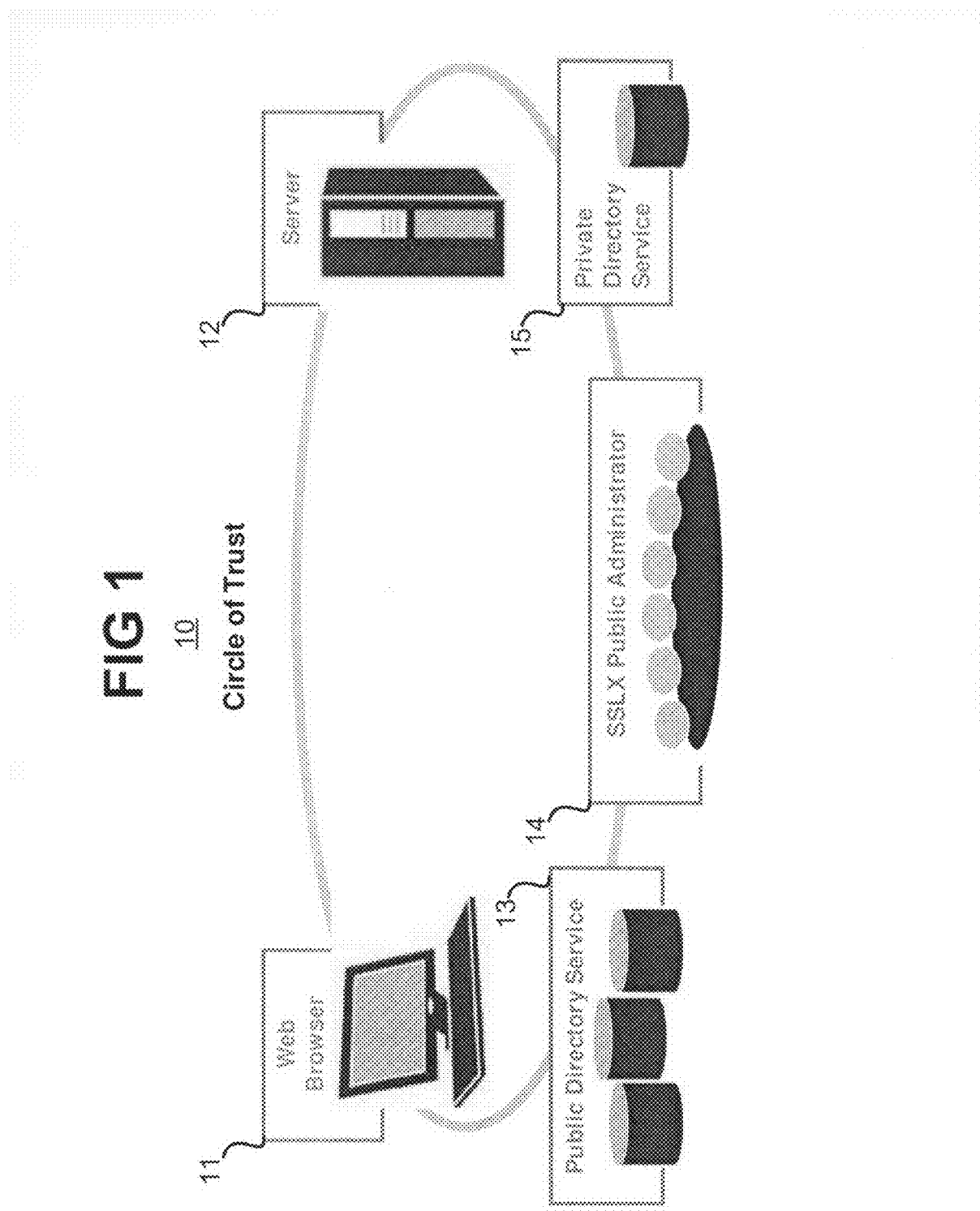
FIG. 1 is a diagram of a computer network with the SSLX components according to one aspect of the present invention.

The present invention comprises a novel process and related computer program embodied in a computer readable and usable medium for ensuring private communications between application programs running on different computers. Descriptions of specific applications are provided only as examples. The present invention is not intended to be limited to the embodiments and examples shown, but is to be accorded the widest scope consistent with the principles and features disclosed herein.

Before describing the present invention, it should be noted that simple decryption using a shared key does not in and of itself provide authentication. This is due to the fact that when the shared key is discovered (through any means including brute force of the key space), the knowledge of the key leads to the ability to both decrypt every message from then on, as well as impersonate the key owner by encrypting false messages; SSL authenticates only once at the start of any session, and therefore has this simple decryption vulnerability.

The present invention, which provides embedded authentication in the encryption process, termed SSLX-EA, begins with a shared authenticated key that is provided out-of-band. Then instead of using the key for simple decryption (with its vulnerabilities), SSLX-EA uses the ability to decrypt properly as probabilistic authentication because the shared key is not used directly for decryption but rather to generate, through a one-way process, a unique message key for every message. Should an adversary discover one of the message keys and properly decrypt a single message, this does not lead to the ability to decrypt the next message nor impersonate a sender and generate proper SSLX-EA output. SSLX-EA keeps the sanctity of the original shared key (K1) as an authentication token because knowing the random number (R) and the message key (W) does not lead to the alphabet used (A) or to the original shared key (K1). Moreover, knowledge of any message key (W) does not lead to the next or any future message keys (W). SSLX-EA closes the simple-decryption hole that exists in SSL by adding a fast authentication mechanism to every communication.

As used herein, an application can be any software program or operating system. Moreover, web server or servers can be any device coupled to a network capable of communicating with another device or application on the network. SSLX as a process for embedded authentication and data encryption may be placed at any level of a communications network. It can work at the application layer placed into web browsers and web servers; and work as well all the way down through the session, transport and network layer when placed into an operating system, router or any network switch device. The features of speed, low-power consumption and small code size allow SSLX to work in wireless architectures (voice and data) as well as any sensor or other remote network communications platforms. SSLX is a protocol independent of the communications architecture, allowing it to work anywhere network participants need secure, private messaging.

A. The World Wide Web Browser—Server Model

SSLX is available to provide authenticated and secure communications in a World Wide Web architecture. Once in place, SSLX operates as a software component of a web server and within the software web browser application. Another software application resides at a third party, which constitutes a respected, independent public party that brokers trust and helps provide the secure channel between the browser and the server. The third party is called a Directory Service (DS).

Directory Services, as will be shown, can operate in two different ways: one as an open entity available to the public, or as a private entity operating to broker trust between private servers and a closed-community of web browsers. The private entity operating to broker trust between private servers and a closed communication of web browsers is called a Private Directory Service. The last piece of the SSLX web example is a SSLX Public Administrator (PA), which is another public body responsible for managing the public Directory Services; the PA does not provide any part in brokering the electronic mechanisms between the three other parties.

All of the parties work in concert to provide the Circle of Trust 10 as shown in FIG. 1. A web browser 11, server 12, public directory service 13, SSLX Public Administrator 14 and Private Directory Service 15 all work in concert to implement and operate a circle of trust 10, as will be described in more detail below.

Normal SSLX Operation (Trusted)

Normal communications flow for SSLX is used when both the browser and the server share SSLX-EA (Embedded Authentication) Session Master Keys (SMKs). The SSLX-EA is explained below. The browser obtains the SMK through one of two methods:
 1. Performing an SSLX Authentication Handshake; or
 2. Performing an out of band process that entails the end-user authenticating to the server owner, and the server creates and stores the key associated with this particular browser, while the browser owner enters the key into the browser application.

Normal Operation

Figure 2:
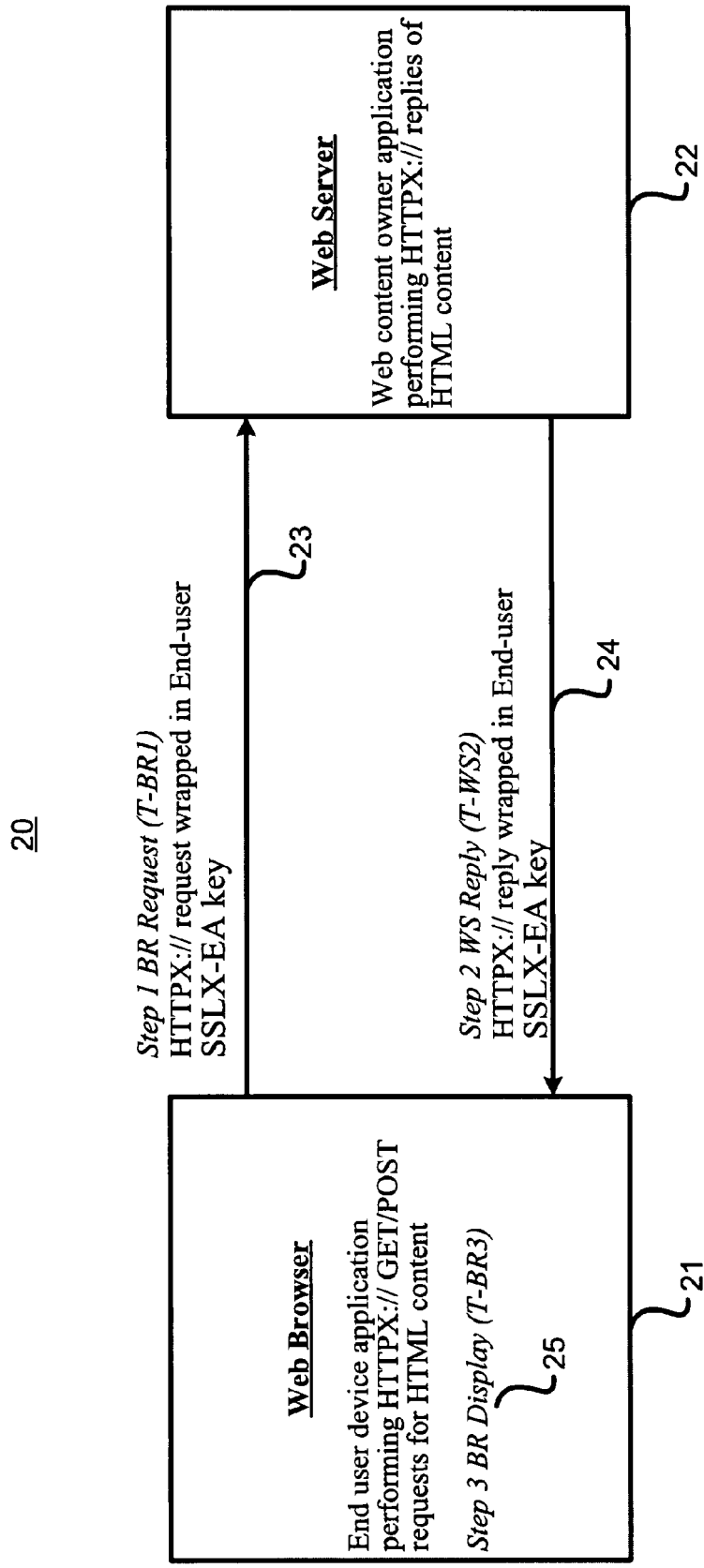
FIG. 2 is a diagram of the normal SSLX trusted communication after brokered third part trust from a Directory Service (DS) according to another aspect of the present invention.

Referring to FIG. 2, Normal Operation 20 occurs when a web browser 21 sends every GET and POST request to the web server 22 wrapped in an SSLX-EA exchange (T-BR1) 23. As used herein, "wrapped in an SSLX-EA exchange" means using a message key to encrypt the request, which message key is generated from a session master key (SMK) combined with a random number that is included with the encrypted request to the server. The exact details of this SSLX-EA technique are set forth below. This process is also called a one pass key generation probabilistic authentication process. In short, the browser 21 authenticates each and every GET and POST request as well as encrypting it. The web server 22 replies using the same known SMK with content wrapped in an SSLX-EA exchange (T-WS2) 24. Similarly to the browser, the server authenticates each and every response to the browser as well as encrypting the content being transmitted. The web browser 21 then unwraps the reply content and displays it to the user (T-BR3) 25.

Each and every exchange can be uniquely encrypted and delivered; or each round-trip (including request and reply) can be uniquely encrypted. A setting on the server is provided that defines an SSLX-EA session length. An exemplary embodiment of a setting for an SSLX session length in a web architecture comprises one HTML page so that each page has a unique SMK exchange and message key to include the request and reply of all the objects on that page.

At each session, the SSLX communications traffic is quite simple: the web browser 21 wraps each request in either an SSLX-EA key exchange and ciphertext (if session start) or cipher text only (if inside session) and sends it to the trusted web server 22. The server 22 either unwraps the SSLX-EA key exchange and decrypts the request, or simply decrypts the request, then processes the request to obtain the content, then wraps the reply in either an SSLX-EA key exchange (if session length is set for every communication) or cipher text using the session key and returns it to the browser 21. The browser 21 then unwraps the content, performing an SSLX-EA key exchange decrypt or just a cipher decrypt, and processes it. SSLX uses any standard electronic cipher to encrypt and decrypt the cipher text.

SSLX Authentication Handshake (AH)

The SSLX Authentication Handshake process is used when only the server has SSLX-EA keys to start. The SSLX Authentication Handshake is an operation at the start of an anonymous web surfer connection to a web site page where sensitive/private/secure information will be exchanged and the surfer will be shown proof that the web site connected to is, indeed, the intended recipient of the information. This is the initialization of secure communications between the browser and the server.

The Authentication Handshake involves checking that the server is the server it is supposed to be. There are only two logical ways to do this:
 1. Previous knowledge; or
 2. Ask a third party—preferably a trusted one.

The first method implies a previous relationship—which is the Trusted Operation mode, with both parties providing proof through their previous encounter (key establishment out of band).

The SSLX implementation of the "ask someone" third party is performed by what is termed a Directory Service/Server (DS). An SSLX DS functions as a public, known entity that holds the pertinent information to (securely) communicate with any particular directory member. An SSLX DS in a web infrastructure would have a known static IP address, operating a simple SSLX application and database for routing real-time requests and replies. The requests are secured with a requestor-generated public key or with a DS SSLX-EA key if the browser has performed a Verified Set Up (VSU). The replies are secured in the same manner, and are half of the necessary information for the requestor to combine and verify that the reply and the web-connected location are one and the same. The other half of the information is provided directly from the web site to the requestor in the requestor-generated public key.

The assurance of (trust in) the open public DS is based on the following:
 Out-of-band verification of the DS location can be made;
 Real-time spoofing/manipulating both the site location and the DS location to/from the browser is difficult to accomplish, and requires first 'breaking' the Verified Server Set Up process (which requires internal trusted human malice to accomplish);
 The information provided to the DS can only have come from a pre-registered SSLX server; the information provided by the DS can be delivered securely in either a pre-registered not-vulnerable (SSLX-EA) or non-registered minimally vulnerable manner (public key);

The only location where the entire communications information can be assimilated is at the requestor—the DS never stores any information about the requester nor the site request; and DS connectivity can be made at a page location without any security requirement so that no session information is exchanged until after additional trust activity can be accomplished by checking specific site content.

All of these together form a solid secure means for an anonymous web surfer to authenticate any SSLX participating server/web site.

The Directory Service/Server (DS) is an important component of third party trust that is implemented in a different, more scalable and less exclusive manner than Certificate Authorities (CAs) in SSL/TLS—they also form a more basic and less formal function of simply being a trusted switch as opposed to a registration and repository "authority." The DS network is more like a series of Information Desks that all know about their particular building and members, instead of a hierarchical authority network of CAs that are akin to store security offices. Since Ecommerce trust in an identity exchange is simply a verification that one is buying from a real store on the third floor of a particular building as displayed on the web site, it's much easier and just as valid to ask the helpful attendant at the Info Desk, than it is to go find the security officer.

The DS network in SSLX does not require interconnectivity of DS operators. In order to be assured that a DS is operating in a trustworthy manner, there is an outside trusted SSLX Public Administrator (PA). The PA is a:

Respected, independent third-party that provides governance of worldwide Public Directory Services;

Allocates operational licenses for DSs, maintaining control so that public assurance of a DS can be verified;

Provides quality control and compliance standards for DS; and

Authority for DS lookup, validating DS for users.

The purpose of the DS is to validate a web server; a direct result of their presence in the Authentication Handshake is that the network of DS switches then enables multiple security levels for the end user. The listed options for the AH are included to handle different means of communicating with known and unknown DSs. This results in SSLX being able to offer different security levels. The risk associated with even the lowest level of security provided by the AH options are well defined and limited; the risk at the highest level is almost non-existent—there are out-of-band options as backup of the only vulnerabilities.

The levels are based on three different use models from the end-user browser perspective. The server will always have participated in at least one Directory Service Verified Set Up, so it is able to perform at the highest level at all times—active server management in setting up with more and multiple DSs will allow the server to participate more fully with the browser and not lower the browser's security expectation (setting), since the end-user has the ability to choose which way it would like the server to reply through the DS.

Since all servers must perform at least one Verified Setup, there is at minimum one public DS that must exist. Should there only be one in any architecture, that DS will be called the Common Directory Service (CDS).

The SSLX Security Levels:
1. High—Both the server and the browser have executed the one-time Verified Set Up for various Directory Services, with at least one in common; and
2. Medium—There are two scenarios for medium security:
   a. The browser has asked to use a particular DS with which the server has not verified so the Server's DS will be used with browser public key communication; or
   b. The browser has not verified with any DS, but has been set for this level so it will communicate with any particular DS using public keys; and Low—The browser and the server will communicate directly without any DS intermediary using public keys (susceptible to a Man in the Middle (MITM) attack—this level of security is akin to the security of regular house locks: break-ins are rare, but they do happen).

Private DSs can be established where end-users are invited to perform a Verified Set Up (VSU) and these do not have a listing in the PA. For these, the web content owner is mandating that the only information that will be dispersed is using the High Security Level for any communication—in this case, the server will be set to not reply to any browser that has not undergone the VSU with the private DS.

Operation.

Figure 3:
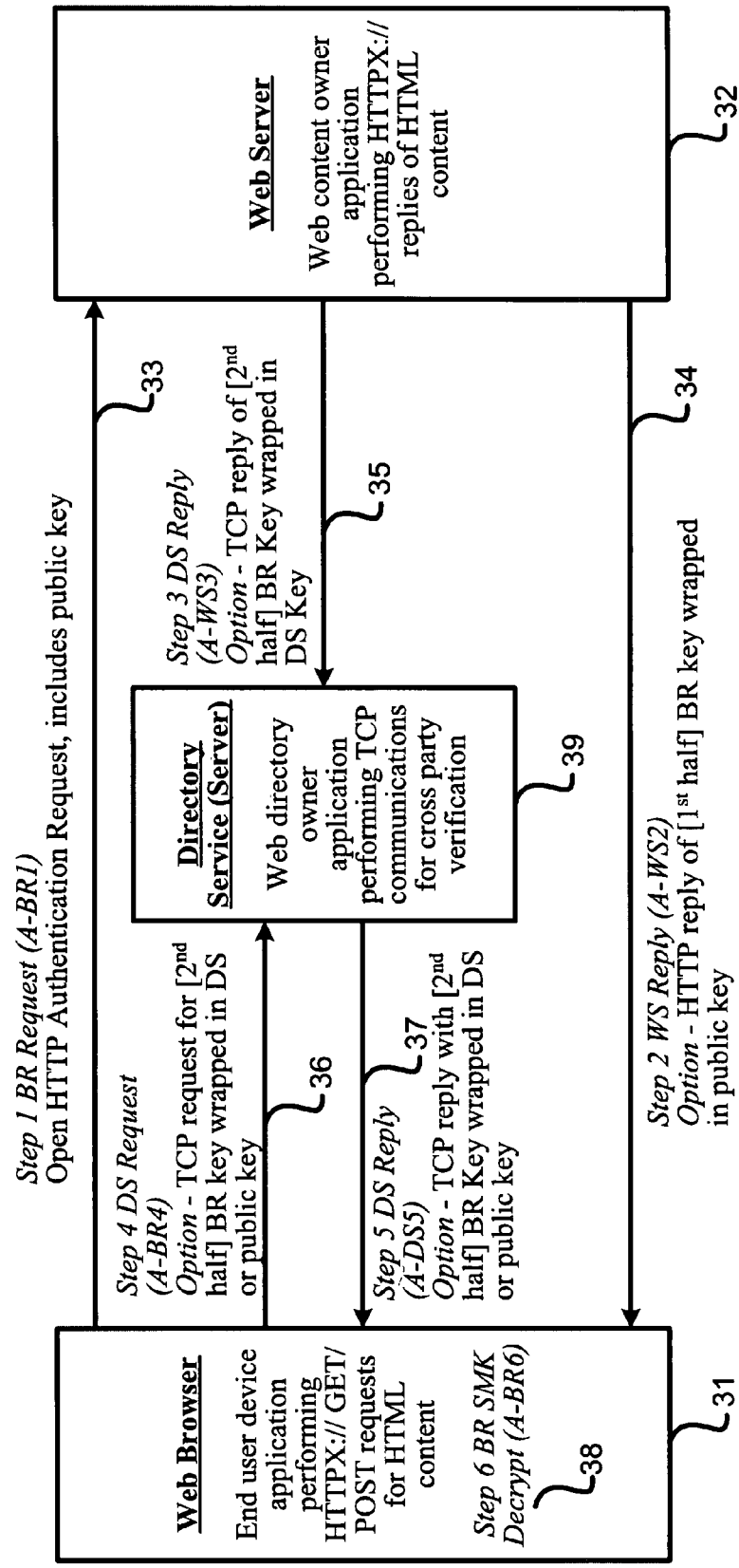
FIG. 3 is a diagram of the SSLX Authentication Handshake according to yet another aspect of the present invention.

Referring to FIG. 3, the following is a description of the Authentication Handshake 30. The Authentication Handshake (AH) 30 occurs when a web browser 31 first creates a public and private key pair and sends an open request to the web server 32 for a trusted SSLX-EA Session Master Key (SMK) to be wrapped in the public key (A-BR1) 33. The request 33 has an Authentication Request value that determines which, and with what elements, of the following is performed. The web server 32 will make two replies after generating the SMK for this browser—one directly back to the browser with the $1^{st}$ half of the SMK wrapped using the browser's sent public key (A-WS2) 34; and the other to the DS 39 with the $2^{nd}$ half of the SMK wrapped using the web server's DS key (received during Verified Set Up) (A-WS3) 35. The browser 31 then sends an open request to the Directory Service (Server) (DS) 39 specified by the Web Server 32 for the other half of the SMK wrapped in the browser's DS key (if received during Verified Set Up), or a public key (if the browser has either not verified with this DS, or the browser has not verified with any DS and this is then the Server's DS by default) (A-BR4) 36. The DS 39 will relay the $2^{nd}$ half of the SMK back to the browser 31 using the browser's DS or public key (A-DS5) 37. The browser 31 will decrypt the SMK to then begin secure communications with the web server 32 using Normal Operation (Trusted) (A-BR6) 38.

A switch-based relay of the SMK through the DS 39 is made to both speed up the process (i.e., no encryption or decryption is done at the DS 39 during normal communications between the server and browser, but of course encryption/decryption is conducted during the exchange of the portions of the SMK) and to assure both the server owner and the browser owner that the DS 39 does not 'know' the relayed half of the actual SMK—it would be possible to store the exchange and perform a decrypt, but even if this were done, it is only one half of the key and is worthless. Any operating DS 39 should be required to demonstrate that it is not storing exchanges.

The manner in which the Security Level options are selected in the AH 30 is as follows: In the initial browser request, depending on the security setting, a list of DSs where the browser has performed a VSU is sent to the server, along with a public key for the reply. If the setting is High, the browser will send its list of VSU DSs; if the setting is Medium, it will send either the list (if it has one) or a blank list. If the setting is Low, then the browser will set a flag and tell the server to completely disregard using a DS and send back the authentication reply in total. When the server receives the list, it selects one that it has in its list of where it has undergone a VSU—or if the browser list is blank, the server defaults to using its DS; if the flag is set for security level Low then the server will reply in total directly to the browser.

For Medium or High settings, the server will default its DS if its list of DSs does not match any of those in the browser DS list. As the server readies to reply to the browser, it first generates a DS ID for this AH. Then the server will reply to the browser (using the browser public key) and include the DS as the selection as well as this transmission's DS ID, along with the pertinent $1^{st}$ half of the Session Master Key (SMK). The server also replies to the DS using its DS key with the $2^{nd}$ half of the SMK; the server will always have a DS key to, at minimum, the CDS so the server-to-DS reply will always be SSLX-EA-encrypted.

When the browser receives the server reply, it unwraps the public key encrypted content. In a Low setting, the browser will process all of the content and the SMK is now shared and the browser and server are ready for Normal Operation. For Medium or High settings, the reply will include the server-selected DS. If this DS is not what the browser expected (was not in the list) and the browser security level is set to High, a warning should appear; if it was in the list, then the request and reply to the DS will use the browser's DS SSLX-EA key (for High and Medium). If the setting is for Medium and the DS is not in the list (because it wasn't in the sent list or there was no list), then the browser will use its public key for the DS request and reply communication.

A summary table of the Security Settings and resulting Options is shown in Table 1 below.

TABLE 1

| Security Setting | Browser | Server | Browser |
|---|---|---|---|
| High | AH initial request includes DS list | Select from list where match; if no match use Server DS | If not expected, warning! If expected, use DS SSLX-EA key |
| Medium | AH initial request includes DS list or flag set to Medium (blank list) | Select from list where match; if no match use Server DS or any VSU DS (log file notify of unknown DSs from list) | If match, use DS SSLX-EA key. If Server DS or unknown DS, use public key to DS |
| Low | AH initial request includes flag set to Low | Reply directly to browser, no DS involved | Unwrap reply for SMK, no DS involved |

After an Authentication Handshake and the symmetric knowledge of the browser's SMK between the web server and the browser, Normal Operation handles all content requests and replies.

Verified Server (Optional Browser) Setup

The purpose of the Verified Setup is to establish a known relationship between two parties; in SSLX, this is between a server and a DS, or between a browser and a DS. At minimum, every server must undergo the Verified Setup (VSU) with at least one Directory Service/Server (DS). This establishes the minimum security of the SSLX system without end user participation to be Medium as described above. The optional browser participation in a VSU, to at least one DS, establishes the ability to communicate with High security.

In order to verify the initial authenticity of two parties in an electronic communication, it is obviously best to have some kind of human interaction. In SSLX, there are three means offered, one that entails minimal human interaction and a second automatic process. The entire impetus of a VSU is the act of verification. In either SSLX method, there is always the opportunity to further verify authenticity by 'double checking' in some other out-of-band method in addition to what is described here—such as phone, mail or additional personal interaction between the server owner and the DS operator.

The three SSLX methods:
1. A public key exchange between the server (or browser) and the DS of the SSLX-EA key (Low);
2. An email exchange of the SSLX-EA key (Medium); and
3. A combination of public key exchange and an email of two halves of the SSLX-EA key (High).

The operating code of an SSLX server and the browser will be set up to handle any of these methods, if not automatically, with human interaction (cut and paste, typed entry of the key, etc.). While some might argue that both email and a public key interaction are susceptible to Man-In-The-Middle (MITM) attacks, whether used separately or together, the most important aspect to remember about a Verified Set Up is that prior to any SSLX traffic of any kind, an additional out-of-band check can be made concerning the authenticity of the set up. It will be assumed that those web sites with an active interest in the security system and their customer's perceptions and expectations will generally use some kind of out-of-band spot checking of their set ups.

Operation

Figure 4:
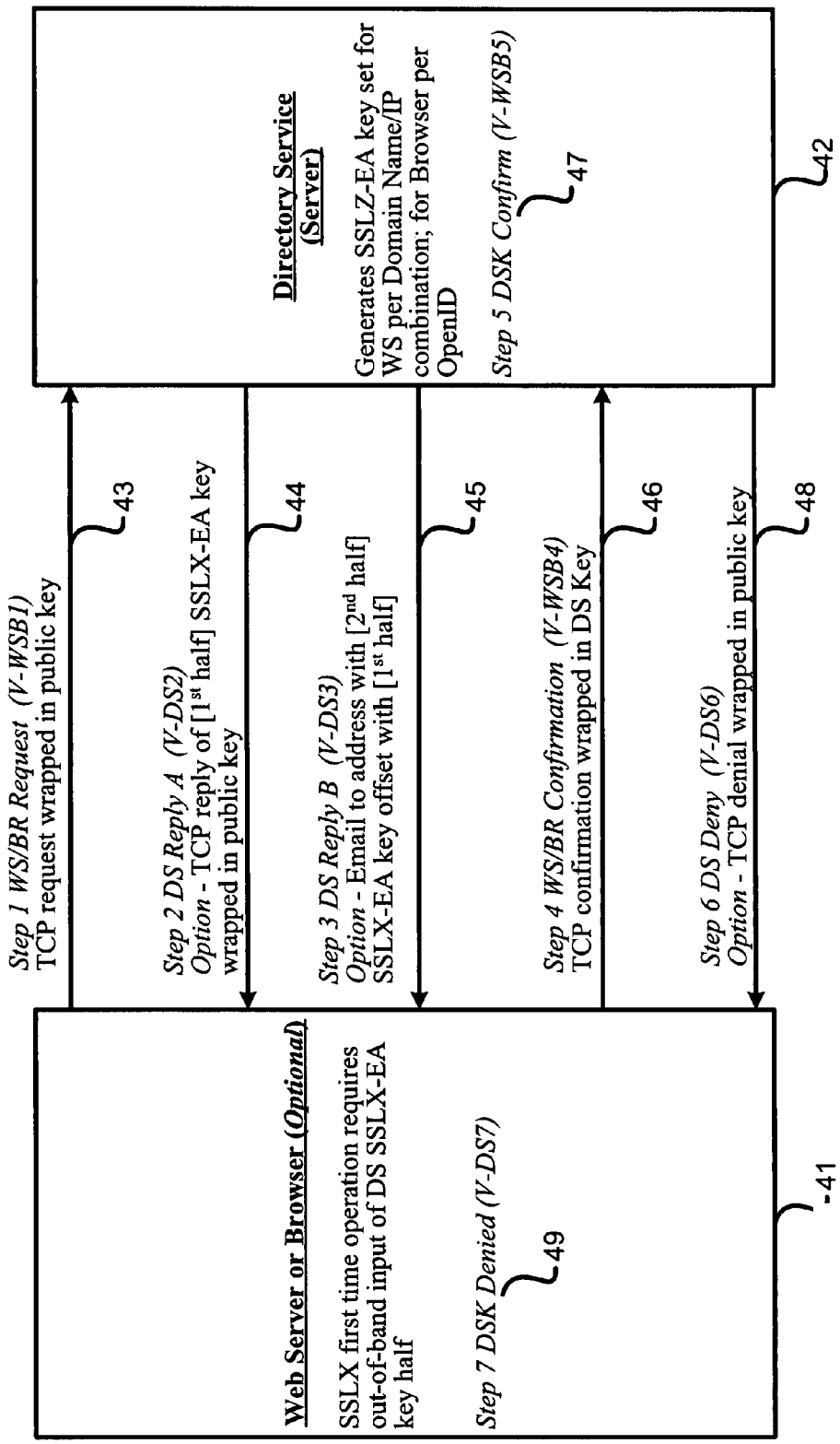
FIG. 4 is a diagram of a Verified Setup (VSU) according to still another aspect of the present invention.

Referring to FIG. 4, the following is the standard operation of the Verified Set Up 40 for both browser 41 and a server. The server (or browser) 41 first creates a public and private key pair, and sends an open request to the Directory Service 42 for a trusted SSLX-EA DS Key (DSK) to be wrapped in the public key (V-WSB1) 43. The request has an Authentication Request (AR) value that determines which, and with what elements, of the following is performed:

If the AR value is for the public key option, the DS will make only a single reply with the entire DSK wrapped using the sent public key (V-DS2) 44;

If the AR value is for the email option, the DS will make a single reply with the entire DSK sent in an email to the email address specified in the AR (V-DS2) 44;

If the AR value is for a combination of both public key and email, the DS will make two replies after generating the DSK for this server or browser—one directly back to the server/browser with the $1^{st}$ half of the DSK wrapped using the sent public key (V-DS2) 44; and the other in email to the email address specified in the AR with the $2^{nd}$ half of the DSK offset by the $1^{st}$ half (V-DS3) 45.

The server or browser 41 will allow input of up to the two halves of the DSK and store the DS DSK in the list of VSU DSs; and in order to finalize the verification set up, a confirmation TCP message will be sent to the DS 42 wrapped in the new DSK (V-WSB4) 46. The DS 42 will use the DSK to decrypt the confirmation message (V-WSB5) 47. If it is not confirmed, and the sent values do not equal the calculated values, then the DS 42 will send a "denied" message back to the browser or server 41 wrapped in the public key (V-DS6) 48. The browser or server 41 will then decrypt the denied message, send a notification to the user and remove the DS from the VSU list (V-DS7) 49.

After a Verified Set Up, both the server and the browser maintain a list of the DSs, along with the associated DSKs, and include these in Authentication Requests at SSLX-supported web sites.

While the previous embodiment shows transmitting a first half of the DSK via one path and a second half via another path, the invention is not limited to sending exactly half two ways, rather a first portion could be sent one path and a second portion could be sent another path, but the size of each portion could be different, as long as the total of both equals the entire DSK. Moreover, more than the necessary portion could be sent. Furthermore, more than two paths could be employed and in this case multiple portions of the DSK could be sent over multiple paths.

Details of SSLX Interactions

The following are the design specifics of each SSLX operating mode and process.

Normal Operation (Trusted)
Browser SSLX-EA Session Master Key (SMK)—if obtained from Authentication Handshake.
   Associated with an OpenID, which is a unique identifier for this session at this server.
Browser SSLX-EA SMK—if obtained from data owner for secure access to specific domain.
   Obtained through out-of-band authenticated process to trusted server owner (e.g., such as an employee sending an email to an administrator with pertinent authentication information (employee number, etc.) and the administrator replying in email with the key and permanent OpenID).
    Server randomly creates a K1 value for each authenticated and accepted user.
    K1 value is stored, along with an assigned OpenID in the server's Key Distribution Center (KDC).
    K1, OpenID and Domain are returned to the browser owner in the desired out of band method.
Inserted into browser.
  Menu option to add
  Add/Edit Form
   Cut and paste or type key and OpenID and Domain
   Option to PIN protect (0/1 entry on first digit of cookie or some method)
    Enter PIN, Reenter PIN
    MOD16 (PIN, key)
    Store in text file (cookie—format TBD)
Session Length
  Server setting to define session length
   0 (default)=one HTML page
   1=every request
   2=every request/reply round trip
   3=on first page (initial request to server)
   4=every 5 requests
   5=every 10 requests
   6=every n requests
GET/POST Browser Request for HTTPX://web address (browser, FIG. 2, Step 1, T-BR1)
  Get SSLX-EA SMK and OpenID
   Look up stored browser SMK
   If key exists, is it PIN protected (1 on first digit of cookie=Yes, 0=No)
    If Yes, Form to enter PIN
     Upon PIN entry, open key file, read key and MOD16D (PIN, key-encrypted), read result into memory
    If No, open key file and read key into memory
   If no key exists, perform an Authentication Handshake, use the resulting SMK
  Get Request text
  If start of SSLX-EA session,
   Perform an SSLX-EA
   Send SSLX-EA output in HTTPX to server
  Else if inside SSLX-EA session,
   Perform cipher encrypt using session SSLX-EA message key on request plaintext
   Send OpenID, ciphertext in HTTPX to server
HTTPX Reply (server, FIG. 2, Step 2, T-WS2)
  Get Browser's SMK based on request OpenID;
   If was created during an Authentication Handshake, then is stored in the local memory/immediate area
   If OpenID was not just created in an Authentication Handshake, this is either a file lookup for file-based KDC, or a Database lookup for DB KDC
  If start of SSLX-EA session,
   Perform SSLX-EA decrypt
   Process decrypted browser request, obtaining requested content
   Perform SSLX-EA encrypt where content is the plaintext
   Send SSLX-EA output in HTTPX back to browser
  Else if inside SSLX-EA session,
   Perform cipher decrypt using SSLX-EA message key
   Process decrypted browser request, obtaining requested content
   Perform cipher encrypt using SSLX-EA message key on content
   Send OpenID, ciphertext in HTTPX to browser
Browser Receipt of Content (browser, FIG. 2, Step 3, T-BR3)
  If this is a receipt of a newly started SSLX-EA session (session length=1),
   Perform SSLX-EA decrypt
  Else if inside an SSLX-EA session (session length <>1),
   Perform cipher decrypt using current SSLX-EA message key
  Process decrypted server content, obtaining HTML text/graphic/data
  Process HTML in browser and display to user
Key Update (browser and server versions, for permanent Trusted mode—Non-AH operation)
  As SSLX is intended to leverage HTTP's statelessness, each session would require a re-obtainment of the key from the KDC; but this operating condition might place unnecessary load (delay) on the server. As such, the server may be configured to hold an array of OpenID's and their associated SSLX-EA key in memory. There can also be a 'logout' or 'session end' message sent from the browser to the server upon either an application close or address bar request outside of the server's domain to release the key from server memory.
  As SSLX will be using the SSLX-EA method with a static key, it is pertinent to the security model to update K1 at some interval.
   Upon reaching the metric equal to the configuration setting in the server for K1 Update (e.g., a number of messages, a random time value, etc.), perform a key update exchange using the new K1 as the plaintext Hold the new K1 value until both server and browser confirm they have it, then update the key in the browser (using PIN if opted) and update the server KDC Authentication Handshake (AH)

For an AH, the first pertinent item is the Browser Configuration. As mentioned, the browser can set the security level of their SSLX connections. Along with the security setting, there are two other configuration items the user may set:

Option to use a preferred, particular DS to send entire handshake through

Option to accept lowering the desired security level because the server cannot meet the setting (e.g., doesn't know the same Directory Service).

Table 2 lists all of the possible combinations of settings the user may select.

TABLE 2

| Security Level | DS AH Only Option (specify DS) | Accept Lower Security Level Option (On-Yes/Off-No) | Security Setting Flag Code | Server Response |
|---|---|---|---|---|
| High | X or no X | | 0 | If knows a DS - Ok<br>If not know a DS - FAIL |
| High | X or no X | X | 1 | If knows DS - Ok<br>If not know DS - Ok as 3 |
| Medium | X | (X or no X) | 2 | If knows DS - OK<br>If not know DS - Ok as 3 |
| Medium (Default) | | (X or no X) | 3 | If List and knows a DS - Ok<br>If List and not know - Ok as CDS |
| Low | Not Available | Not Available | 4 | Ok |

When High is chosen, the browser user will be prompted to perform a DS VSU in order to retain the setting (if one is not already performed).

Browser Initiate to Web Server (browser, FIG. 3, Step 1, A-BR1)

Create Public/Private key pair as per method

Select shortest/fastest/most secure method of public/private key pair generation and generate key pair (Elliptic Curve Cryptography—ECC, most likely choice)

For best security practice, generate as per AH—do not store/re-use

Send Authentication Request (AR) in HTTPX://call to web server

Send Security Setting Flag code, optional public key, optional VSU DS list (DS Name; DS IP Address, etc.) to web server (Security Setting Flag code is a setting in the Browser Config—Set initially on Browser Set Up to Medium (#3), the default)

Security Setting Flag (SSF) codes where:

0 (High)=key halves sent to BR and through Verified Set Up (VSU) DSs

VSU list (possibly includes CDS, has at least one), OpenID, DS ID, public key included 1 (High)=DS Only—entire key sent through VSU DS (public key included in case lowered to #3; a pre-registered DS Key exists at specific VSU)

List with at least one DS, OpenID, DS ID, public key included 2 (Medium)=DS Only—entire key sent through DS (optional VSU DS list or just a DS list, or no list)

Optional VSU DS List, OpenID, public key included, DS ID 3 (Medium)=(default), key halves sent to BR and through a DS;

Public key included and optional VSU DS list, or just a DS list or no list), OpenID, DS ID 4 (Low)=BR Only—entire key sent back to Browser (no DS)

Public key included, OpenID

OpenID is a 16-digit random hex number that identifies this browser (for this AH and instance of the browser)

DS ID is a 32-digit random hex number that identifies the request ID that will be found and replied to in the DSDS IP is the public IP address of one of browser's Directory Services (VSU)

Domain Name is a public HTTP designation—e.g., "www.sslnext.com"

Web Server reply to browser based on AR, SSF (server, FIG. 3, Step 2, A-WS2)

If SSF=0

Generate browser SMK (K1, 256-bits)

Select matching VSU from browser list, get DS key (DSK)

IF NO MATCH, reply (wrapped using public key) with SSLX Error # "No VSU Match—cannot process High Security without option to lower, Code 0"

Browser error message says to look at configuration options, and change if want to connect to this server with current settings Generate log text file entry (if no file, create; if exists, append) of DS info (DS IP)

Reply with $1^{st}$ half (32-digits, 128-bits) of SMK, DS IP, Domain Name wrapped in public key (Public key encryption method)

Perform Step 3 to selected DS, using DS DSK and sending the browser's OpenID, the DS ID and $2^{nd}$ half of SMK If SSF=1

Generate browser SMK

Select VSU DS from browser, get DS key (DSK)

IF NO MATCH, reply as if flag SSF setting was a "3", continue below (as lowering security level is acceptable)

Generate log text file entry (if no file, create; if exists, append) of DS info (DS IP)

Reply with DS IP, Domain Name wrapped in public key (so browser knows which DS was chosen)

Perform Step 3 to specific DS, using DS DSK and sending the browser's OpenID, DS ID and whole SMK If SSF=2
  Generate browser SMK
  Select matching VSU DS from browser list (if list), or any DS (if list), or use CDS if no list—get DS key (DSK) (will at least be a CDS DSK)
    Should not be any error, as can use lowest common denominator of CDS
    Generate log text file entry (if no file, create; if exists, append) of DS info (DS IP) not in server's VSU list
  Reply with DS IP, Domain Name wrapped in public key
  Perform Step 3 to selected DS, using DS DSK and sending browser's OpenID, DS ID and whole SMK If SSF=3 (Default)
  Generate browser SMK
  Select matching VSU DS from browser list (if list), or any DS (if list), or use CDS if no list—get DS key (DSK) (will at least be a CDS DSK)
    Should not be any error, as can use lowest common denominator of CDS
    Generate log text file entry (if no file, create; if exists, append) of DS info (DS IP) not in server's VSU list
  Reply with $1^{st}$ half (32-digits, 128-bits) of SMK, DS IP, Domain Name wrapped in public key
  Perform Step 3 to selected DS, using DS DSK and sending the browser's OpenID, DS ID and $2^{nd}$ half of SMK If SSF=4
  Generate browser SMK
  Perform Step 5 sending whole SMK, Domain IP Address, Domain Name back to browser wrapped in public key

[Optional] Server Reply to Directory Service/Server (server, FIG. 3, Step 3, A-WS3)
  Since the server must have gone through Verified Set Up to at minimum the CDS, then there is a DS Key (DSK)
  This step is called with the DS ID and DS IP as parameters (from SSF return), minimally, the CDS
  If SSF=0
    Send OpenID, DS ID and $2^{nd}$ half of SMK
      Perform SSLX-EA key exchange using DSK, create new message key
      Use message key in AES to encrypt the browser's OpenID, the DS ID, and the $2^{nd}$ half of SMK
      Reply to DS's IP w/WS's OpenID at the DS, the SSLX-EA output (R and W1), and the ciphertext of SMK, DS ID
  If SSF=1
    Send OpenID, DS ID and whole SMK
      Perform SSLX-EA key exchange using DSK, create new message key
      Use message key in AES to encrypt the browser's OpenID, the DS ID, and the whole SMK
      Reply to DS's IP w/SSLX-EA output, the browser's OpenID and ciphertext of SMK, DS ID
  If SSF=2
    Send OpenID, DS ID and whole SMK
      Perform SSLX-EA key exchange using DSK, create new message key
      Use message key in AES to encrypt the browser's OpenID, the DS ID, and the whole SMK
      Reply to DS's IP w/SSLX-EA output, the browser's OpenID and ciphertext of SMK, DS ID
  If SSF=3
    Send OpenID, DS ID and $2^{nd}$ half of SMK
      Perform SSLX-EA key exchange using DSK, create new message key
      Use message key in AES to encrypt the browser's OpenID, the DS ID, and the $2^{nd}$ half of SMK
      Reply to DS's IP w/SSLX-EA output, the browser's OpenID and ciphertext of SMK, DS ID
  If SSF=4, skip this Step

[Optional] Browser Request to Directory Service/Server (browser, FIG. 3, Step 4, A-BR4)
  Either the browser has gone through Verified Set Up and has a DS DSK, or the DS will be given the browser's public key for the reply
  This step is called with the DS ID and DS IP as parameters (from SSF return), or minimally, the CDS
  If SSF=0
    Send a DS Request (DSR) using DSK to the specified DS IP encrypting the OpenID, DS ID and asking for $2^{nd}$ half of SMK, Domain Name, IP Address
  If SSF=1
    Send a DSR to the specified DS IP using DSK where the OpenID and DS ID are encrypted, and asking for whole SMK, Domain Name, IP Address
  If SSF=2
    Send a DSR to the specified DS IP using DSK (if there was a list and there is a DSK), encrypting OpenID, DS ID and asking for whole SMK, Domain Name, IP Address
    If no DSK, send a DSR to the specified DS IP where the OpenID, DS ID and public key are openly sent, and the whole SMK, Domain Name and IP Address are requested
  If SSF=3
    Send a DSR to the specified DS IP using DSK (if there was a list and there is a DSK), encrypting OpenID, DS ID and asking for $2^{nd}$ half of SMK, Domain Name, IP Address
    If no DSK, send a DSR to the specified DS IP where the OpenID, DS ID and public key are openly sent, and the $2^{nd}$ half of SMK, Domain Name and IP Address are requested
  If SSF=4, then skip this Step

[Optional] Directory Service/Server reply to browser (DS, FIG. 3, Step 5, A-DS5)
  If SSF=4, this step is not performed
  The browser has submitted a DS Request (DSR) using either a DSK or a public key for the reply
  If DSR sent using a DSK, then there will be an OpenID
    Use OpenID to get correct DSK for this browser
    If DS ID provided, use it to get correct SMK for this browser session; if not provided, then use OpenID to get correct SMK
    Perform an SSLX-EA Key exchange using the DSK and reveal the message key—check W1 sent w/W1 generated—if match continue (else error)
    Use message key in AES decrypt to reveal request (authenticates browser)
    If SSF=0
    AES Message Key already known from Browser request Use message key encrypt $2^{nd}$ half of SMK, Domain Name and IP Address
Reply to browser's IP with SSLX-EA output, ciphertext
If SSF=1
AES Message Key already known from Browser request
Use message key encrypt whole SMK, Domain Name and IP Address
Reply to browser's IP with SSLX-EA output, ciphertext
If SSF=2
AES Message Key already known from Browser request
Use message key encrypt whole SMK, Domain Name and IP Address
Reply to browser's IP with SSLX-EA output, ciphertext
If SSF=3
AES Message Key already known from Browser request
Use message key encrypt $2^{nd}$ half of SMK, Domain Name and IP Address
Reply to browser's IP with SSLX-EA output, ciphertext
If DSR sent using browser's public key, then there will be a DS ID (and OpenID)
Use DS ID to get correct SMK for this browser session
If SSF=2
Public Key already known from Browser request
Use public key to encrypt whole SMK, Domain Name and IP Address
Reply to browser's IP with ciphertext output
If SSF=3
Public Key already known from Browser request
Use public key to encrypt $2^{nd}$ half of SMK, Domain Name and IP Address
Reply to browser's IP with ciphertext output
Browser decrypt of content (browser, FIG. 3, Step 6, A-BR5)
If SSF=0
AES Message Key is stored, so use it to reveal $2^{nd}$ half of SMK, Domain Name and IP Address
Check Domain Name/IP address from server against domain name from DS—if same continue, else stop and warn user!
Concatenate $1^{st}$ half and $2^{nd}$ half of SMK making it whole
Use SMK in Normal Operations
If SSF=1
AES Message Key is stored, so use it to reveal SMK, Domain Name and IP Address
Check Domain Name/IP address from server against domain name from DS—if same continue, else stop and warn user!
Use SMK in Normal Operations
If SSF=2
If DSR sent using a DSK, then
AES Message Key is stored, so use it to reveal SMK, Domain Name and IP Address
Else if DSR sent using public key
Perform decrypt using public key to reveal whole SMK, Domain Name and IP Address
Check Domain Name from server against domain name from DS—if same continue, else stop and warn user!
Use SMK in Normal Operations
If SSF=3
If DSR sent using a DSK, then
AES Message Key is stored, so use it to reveal SMK, Domain Name and IP Address
Else if DSR sent using public key
Perform decrypt using public key to reveal whole SMK, Domain Name and IP Address
Check Domain Name/IP address from server against domain name from DS—if same continue, else stop and warn user!
Concatenate $1^{st}$ half and $2^{nd}$ half of SMK making it whole
Use SMK in Normal Operations
If SSF=4
Server reply sent using public key
Perform decrypt using public key to reveal whole SMK, Domain Name
Check Domain Name from server against domain in address bar—if same continue, else stop and warn user!
Use SMK in Normal Operations
Verified Server (Optional Browser) Set Up (VSU)
For browser, initiate VSU on menu option to Directory Service/Server (browser, FIG. 4, Step 1, V-WSB1)
For server, initiate VSU on applet/extension execution (server, FIG. 4, Step 1, V-WSB1)
Remaining flow (all Steps) is for both browser and server; details where noted
Create Public/Private key pair as per method
Select shortest/fastest/most secure method of public/private key pair generation and generate key pair (Elliptic Curve Cryptography—ECC, most likely choice)
For best security practice, generate as per VSU—do not store/re-use
Send VSU Request (VSUR) in TCP call to DS
Send DS Flag code, Domain Name (server only), optional public key, optional email address to DS
Browser: DS Flag code is a setting in the Browser Config—Set initially on Browser Set Up to High (#0), the default. No Domain Name required for browser
Server: Only method of operation is High; minimally, VSU occurs on initial startup of server to connect with CDS. Domain Name is a requirement.
DS Flag (DSF) codes where:
0 (High)=key halves sent through email and through DS
Public key, email address, Domain Name included
1 (Medium)=Email Only—entire key sent through email
Email address, Domain Name included
2 (Low)=DS Only—entire key sent through DS (no email)
Public Key, Domain Name included
Email address is a public POP address
Directory Service/Server reply to browser or server (DS, FIG. 4, Step 2, V-DS2)
If DSF=1, this step is not performed
The browser or server has submitted a VSUR using a public key for the reply
Generate OpenID, DSK for entity (browser or server)
If DSF=0
Reply with $1^{st}$ half (32-digits, 128-bits) of DSK, OpenID, wrapped in public key Perform Step 3 to email address, using public key and sending the $2^{nd}$ half of DSK offset (MOD16 encrypted) by $1^{st}$ half
If DSF=2
Reply with whole DSK, OpenID wrapped in public key
Directory Service/Server reply to browser or server (DS, FIG. 4, Step 3, V-DS3)
If DSF=2, this step is not performed
The browser or server has submitted a VSUR using an email address for the reply
Generate OpenID, DSK for entity (browser or server) (IF not already done in Step 2)
If DSF=0
Reply with $2^{nd}$ half (32-digits, 128-bits) of DSK Mod16 encrypted with $1^{st}$ half, OpenID to email address
If DSF=1
Reply with whole DSK, OpenID in message to email address
Browser/server decrypt of reply and confirmation (browser/server, FIG. 4, Step 4, V-WSB4)
If DSF=0
Perform decrypt using public key to reveal $1^{st}$ half of DSK
Open email message to reveal $2^{nd}$ half of DSK
Open Applet for key entry
Enter both halves, and OpenID, into applet fields (form for entry of OpenID, DSK $1^{st}$ half, DSK $2^{nd}$ half, full DSK—when show form, only those applicable to the DSF method (either $1^{st}$ and $2^{nd}$ half active, or full DSK active)
Click button for "Plug In Key" (or some relevant, pertinent UI text)
Applet will take $2^{nd}$ half and perform a MOD16D using $1^{st}$ half to reveal correct $2^{nd}$ half
Concatenate $1^{st}$ half and $2^{nd}$ half of DSK making it whole
Insert into use (store DSK, OpenID in cookie, file, db—method? These are the VSU DSs for the list submission in an AH)
If DSF=1
Open email message in specified email mailbox
Open Applet for key entry
Enter full DSK and OpenID, into applet fields (cut and paste available)
Click button for "Plug In Key" (or some UI text)
Applet will insert into use (store DSK, OpenID in cookie, file, db—method? These are the VSU DSs for the list submission in an AH)
If DSF=2
Perform decrypt using public key to reveal whole DSK
Open Applet for key entry
Enter both halves, and OpenID, into applet fields (form for entry of OpenID, DSK $1^{st}$ half, DSK $2^{nd}$ half, full DSK—when show form, only those applicable to the DSF method (either $1^{st}$ and $2^{nd}$ half active, or full DSK active)
Click button for "Plug In Key" (or some relevant, pertinent UI text)
Applet will take $2^{nd}$ half and perform a MOD16D using $1^{st}$ half to reveal correct $2^{nd}$ half
Concatenate $1^{st}$ half and $2^{nd}$ half of DSK making it whole
Insert into use (store DSK, OpenID in cookie, file, db—method? These are the VSU DSs for the list submission in an AH)
Reply to DS in TCP with Confirmation message
Perform SSLX-EA key exchange using DSK, getting message key
Use message key in AES to encrypt confirmation message
Message format: "[OpenID] DS VSU ready!"
Send SSLX-EA output (OpenID, R) and ciphertext to DS
DS decrypt of confirmation message (DS, FIG. 4, Step 5, V-WSB5)
For all DSF values (0,1,2)
Perform an SSLX-EA Key exchange using the DSK (found by sent OpenID) and reveal the message key
Use message key in AES to decrypt confirmation
If OpenID in message matches OpenID in header, confirmation
If not, send Deny message; Browser/Server only receives if denied
If Yes, store Domain Name, IP Address, OpenID, DSK, email address
[Optional] DS deny message (DS, FIG. 4, Step 6, V-DS6)
If the browser or server receives a DS Deny message, then the DSK is not correct, and the VSU process has failed
DS Deny message is sent wrapped in the public key
Message format: "[OpenID] DS VSU failed!"
Decrypt public key DS Deny message to reveal message
[Optional] Web server/browser deletes stored DSK and OpenID information (browser/server, FIG. 4, Step 7, V-DS7)
Delete stored DSK, OpenID (in cookie, file, db entry—method?)
Notify user of failed VSU
SSLX-Embedded Authentication Description SSLX uses the preceding communications architecture and processes to create an authentic and secure channel between the participants. As the entire basis for the SSLX communications routing is the speed and timing of each secure communications, it is imperative that the method of authenticating and encrypting be able to be performed in real-time for any public network user. An acceptable electronic encryption comprises the Advanced Encryption Standard (AES), which can encrypt in real-time. Currently, no authentication mechanism exists that can operate at the real-time speeds necessary. In order to bring SSLX to realization, a new embedded authentication technique is employed as follows.

The SSLX-Embedded Authentication (SSLX-EA) algorithm is comprised of two parts, one for authentication and one for encryption. Authentication is performed using two new fast and simple low-level functions (combining and extraction) and is performed implicitly (embedded); if the recipient decrypts the cipher text into valid plaintext (an http traffic communication such as a web page or file transfer), then the recipient can safely assume the message came from the correct sender. An exemplary encryption function comprises AES-nBit in a stream mode using a child key created by the extraction low-level function as the message key, where nBit is the defined length of the starting shared Key, $K_1$.

The following process describes the SSLX-EA:

0. One time setup: Establish a shared n-bit key, $K_1$. [SSLX does this by various means as described above, including public key methods and out of band delivery. The secret is a key established between the participants (browser and server) and the trusted third party (DS); this key is termed a Directory Service Key (DSK)].

1. Generate an n-bit random hexadecimal number (32 4-bit numbers for 128-bit), R.
   R should come from an industry standard random number generator/generation technique/process.
2. Combine R and $K_1$, resulting in an n-bit 'alphabet', A.
3. Extract n-bit message key W out of A using $K_1$.
4. Encrypt the plaintext message m: the sender computes the ciphertext $C=E(w_i, m)$ where E is AES-nBit in a stream mode, and sends the following message to the recipient:
   OpenIDSender, R, C, [optionally, t]
where OpenIDSender is the publicly-known identification of the sender and T is an optional n-bit token at the start of the ciphertext for purposes of a quick decrypt authentication check prior to decrypting the entire message (either a static pre-assigned token, a full or partial extract of W out of A, or some other shared value).

SSLX-EA provides simple and fast authentication and encryption between SSLX participants. It combines randomness (Steps 0 and 1), substantial and sufficient loss of information in the combination and extraction functions (Steps 2 and 3), and the best practice industry standard encryption (Step 4).

There are many different available algorithms that may be substituted into the SSLX-EA; but none that are faster, sufficient for the purpose or as simple and computationally inexpensive.

SSLX-EA Low-Level Cryptographic Functions

The Combining Function (Step 2) Details:

2. The combining function details: Combine R and $K_1$, resulting in a n-bit 'alphabet', A.

2.1 Select an R digit by using the $1^{st}$ digit of $K_1$ as a pointer into R beginning at the $1^{st}$ digit position and moving $K_1$'s value in digit positions to the right in R where the starting position in R is the $0^{th}$ value position.

2.2 Select a $K_1$ digit by using the $1^{st}$ digit of R as a pointer into $K_1$ beginning at the $1^{st}$ digit position and moving R's value in digit positions to the right in $K_1$ where the starting position in $K_1$ is the $0^{th}$ value position.

2.3 Hexadecimal add without carry the selected R digit from Step 2.1 and the $K_1$ digit from Step 2.2. This sum is the first digit of the result number, A.

2.4 Repeat 2.1, 2.2 and 2.3 using the next digit to the right in R and $K_1$ where the starting digits for the steps is one position to the right of the previously selected digit (the $0^{th}$ value position). Continue until the result A is the same length as R and $K_1$ (n-bits, 32 4-bit hex numbers for 128-bits).

Example:
   $R_1$=0123456789 $K_1$=9876543210
   2.1: 9, using 9 from $K_1$ and selecting 9 in R
   2.2: 9, using 0 from R and selecting 9 in $K_1$
   2.3: A first digit is 2 from (9+9) Mod 16=2
   2.1: Repeat, taking 8, using 8 from $K_1$ and selecting 8 in R having started at the $1^{st}$ position, which is the first digit position to the right of the previously selected last digit (9)
   2.2: 7, using 1 from R and selecting 7 in $K_1$ having started at the $2^{nd}$ position, which is the first digit position to the right of the previously select first digit (9)
   2.3: A second digit is F from (8+7) Mod 16=F
   continue until reaching the end of $K_1$
   A=2FA3EDA589 from
   (9+9) Mod 16=2
   (8+7) Mod 16=F
   (6+4) Mod 16=A
   (3+0) Mod 16=3
   (9+5) Mod 16=E
   (4+9) Mod 16=D
   (8+2) Mod 16=A
   (1+4) Mod 16=5
   (3+5) Mod 16=8
   (4+5) Mod 16=9

The Extraction Function (Step 3) Details:

3. The extraction function details: Extract n-bit key W out of A using $K_1$ 3.1 Select an A digit by using the $1^{st}$ digit of $K_1$ as a pointer into A beginning at the $1^{st}$ digit position and moving $K_1$'s value in digit positions to the right in A where the starting position in A is the $0^{th}$ value position.

3.2 Use the selected A digit as the first digit of the result number, W.

3.3 Repeat 3.1 and 3.2 using the next digit to the right in $K_1$ and the starting digits in A as one position to the right of the previously selected digit (and this is the $0^{th}$ value position). Continue until the result W is the same length as $K_1$ and A (n-bits, 32 4-bit hex numbers for 128-bit).

Example:
   Using A=2FA3EDA589 and $K_1$=9876543210, resulting in W=98A39E8F3E

NOTE: A known weak key ($K_1$) of all zeros (0) should be avoided as A and W will be identical to R.

Reference Implementation

The following is Visual Basic code for the two SSLX-EA functions and a complete single call function for executing SSLX-EA in either encrypt or decrypt mode:

```
' FUNCTION: SSLX-EA Combine Function
' NAME: SSLXEACombine
' PURPOSE: Function to permute the K1 key with the random salt (R):
'     Step 2 in the SSLX-EA: Combine R and K1, resulting in a n-bit 'alphabet', A
' TYPE:    General function - SSLX-EA Combine call
' CALL:    SSLXEACombine(sR, sK1)
'       where sK1 is the starting key value, sR is the random salt
' RTRN:    A string value of: sA
' ERROR:   Null return
'
' Example:
    SSLXEACombine("45384189FE42A1C1A00F795AA9A0819ED39BBEBF19FBF40F6
AEB4C6B362A56DC",
0123456789ABCDEF0123456789ABCDEF0123456789ABCDEF0123456789ABCDEF")
returns
         "A:
8DF5857C06A9D6DDE421EB4F362E766A1BEA6733FC41F8F0728634720FFF52D7"
' Test Vector: The example is a test vector
'
```

-continued

```
Public Function SSLXEACombine(sRand As String, sKey1 As String) As Variant
Dim sA As String
Dim sRTemp As String
Dim sK1Temp As String
Dim sRi As String
Dim sK1i As String
Dim nCount As Integer
Dim nCount1 As Integer
Dim i As Integer
Dim nStart As Integer
If sRand = "" Or sKey1 = "" Then
    SSLXEACombine = ""
    Exit Function
Else
    'Combine R and K1, resulting in a n-bit 'alphabet', A
    'sA = SSLXEACombine(sR, sK1)
    nCount = Len(sRand)
    nCount1 = Len(sKey1)
    If nCount < > nCount1 Then
        SSLXEACombine = ""
        Exit Function
    End If
    sRTemp = sRand
    sK1Temp = sKey1
    nStart = 0
    For i = 1 To nCount
        nVal = nStart + Val("&H" & Mid(sKey1, i, 1)) + 1
        If nVal > nCount Then
            nVal = nVal – nCount
            nStart = 0
        End If
        sRi = sRi & Mid(sRand, nVal, 1)
        nStart = nVal
    Next
        nStart = 0
    For i = 1 To nCount
        nVal = nStart + Val("&H" & Mid(sRand, i, 1)) + 1
        If nVal > nCount Then
            nVal = nVal – nCount
            nStart = 0
        End If
        sK1i = sK1i & Mid(sKey1, nVal, 1)
        nStart = nVal
    Next
    'Last, mod add the two intermediate strings
    SSLXEACombine = MOD16(sRi, sK1i)
End If
End Function
```

```
' FUNCTION: SSLX-EA Extract Function
'NAME:   SSLXEAExtract
' PURPOSE: Function to extract the W key from the A alphabet:
'    Step 3 in the SSLX-EA: Extract n-bit key W out of A using K1
' TYPE:   General function - SSLX-EA Extract call
' CALL:   SSLXEAExtract(sA, sK1)
'    where sK1 is the starting key value, sA is the combined alphabet
' RTRN:   A string value of: sW
' ERROR:   Null return
' Example:
 SSLXEAExtract("8DF5857C06A9D6DDE421EB4F362E766A1BEA6733FC41F8F0728
634720FFF52D7",
"0123456789ABCDEF0123456789ABCDEF0123456789ABCDEF0123456789ABCDEF")
returns
       "W:
8F56DEEAF7D62F2C0A6447A13D6BE77DE2B66616574640CF326B3F6F8D6788DA"
' Test Vector: The example is a test vector
'
Public Function SSLXEAExtract(sAlphabet As String, sKey1 As String) As Variant
Dim sATemp As String
Dim sW As String
Dim nCount As Integer
Dim nCount1 As Integer
Dim i As Integer
If sAlphabet = "" Or sKey1 = "" Then
    SSLXEAExtract = ""
```

```
      Exit Function
   Else
      'Extract n-bit key W out of A using K1
      'sW = SSLXEAExtract(sA, sK1)
      nCount = Len(sAlphabet)
      nCount1 = Len(sKey1)
      If nCount < > nCount1 Then
         SSLXEAExtract = ""
         Exit Function
      End If
      sATemp = sAlphabet
      nStart = 0
         For i = 1 To nCount
            nVal = nStart + Val("&H" & Mid(sKey1, i, 1)) + 1
            If nVal > nCount Then
               nVal = nVal − nCount
               nStart = 0
            End If
            sW = sW & Mid(sAlphabet, nVal, 1)
            nStart = nVal
         Next
         'Return value
         SSLXEAExtract = sW
   End If
End Function
```

```
' FUNCTION: Authentication and Message Key Generation Function -
Encrypt/Decrypt
' NAME:    SSLXEABundle
' PURPOSE: A full bundled function to perform the SSLX-EA Authentication and
Message
'   Key generation:
'1. Generate a n-bit random hexadecimal number (32 4-bit numbers for 128-bit), R
(Encrypt, Decrypt send in R)
'2. Combine R and K1, resulting in a n-bit 'alphabet', A
'3. Extract n-bit key W out of A using K1
'4. Encrypt the plaintext message m using AES-nBit in a stream mode, and sends the
following
'   to the recipient:
'   OpenIDSender, R, C
'   where OpenIDSender is the publicly-known identification of the sender
' TYPE:   General function - SSLX-EA bundled call
' CALL:   SSLXEAEnc(sK1, sR)
'   where sK1 is the starting key value, sR is the rand # (for decrypt)
' RTRN:   A string value of: sR, sT, sA, sW
' ERROR:   Null return
'Example:
SSLXEAEnc("0123456789ABCDEF0123456789ABCDEF0123456789ABCDEF012345
6789ABCDEF",
45384189FE42A1C1A00F795AA9A0819ED39BBEBF19FBF40F6AEB4C6B362A56DC")
returns
   "R:
45384189FE42A1C1A00F795AA9A0819ED39BBEBF19FBF40F6AEB4C6B362A56DC
   T:
03676F47F3F6D7AF80786476E72522E77FDB7A7F8F779D6C8725CF6F25DE6337
   A:
8DF5857C06A9D6DDE421EB4F362E766A1BEA6733FC41F8F0728634720FFF52D7
   W:
8F56DEEAF7D62F2C0A6447A13D6BE77DE2B66616574640CF326B3F6F8D6788DA"
' Test Vector: The example is a test vector
'
Public Function SSLXEABundle(sK1 As String, Optional sR As String) As Variant
Dim sA As String
Dim sW As String
Dim sT As String
If sK1 = "" Then
   SSLXEABundle = ""
   Exit Function
Else
   'Get a Rnd R (Encrypt), decrypt sends R
   'For n-bit AES...
   If sR = "" Then
      sR = GetRandom((Len(sK1) / 2), "")
   Else
      If Len(sR) < > Len(sK1) Then
```

```
        SSLXEABundle = ""
        Exit Function
     End If
  End If
  'Combine R and K1, resulting in a n-bit 'alphabet', A
  sA = SSLXEACombine(sR, sK1)
  If sA = "" Then
     SSLXEABundle = ""
     Exit Function
  End If
  'Extract n-bit key W out of A using K1
  sW = SSLXEAExtract(sA, sK1)
  If sW = "" Then
     SSLXEABundle = ""
     Exit Function
  End If
  'Encrypt the plaintext message m using AES-nBit in a stream mode
  'Perform this step in the calling area...
  'Note: IF want a token check instead of doing whole decrypt,
  '    uncomment this and use as ENCRYPTED token check; e.g., either
  '    send inside same plaintext or do 2 encrypts/decrypts
  'sT = SSLXEAExtract(sA, sW)
     SSLXEABundle = "R: " & sR & Chr$(13) & Chr$(10) & _
        "T: " & sT & Chr$(13) & Chr$(10) & _
        "A: " & sA & Chr$(13) & Chr$(10) & _
        "W: " & sW & Chr$(13) & Chr$(10)
  End If
End Function
```

Comparison to Secure Sockets Layer/Transport Layer Security (SSL/TLS)

SSLX meets the same goals as SSL/TLS: authentication and data security, including some of the same example architectures such as the Internet. One of the benefits of using SSLX is that SSLX accomplishes the same goals, but does so in fewer steps—and has less data and calculation demand in those simpler steps. The following shows the distinct differences between SSL/TLS and SSLX.

Figure 5:
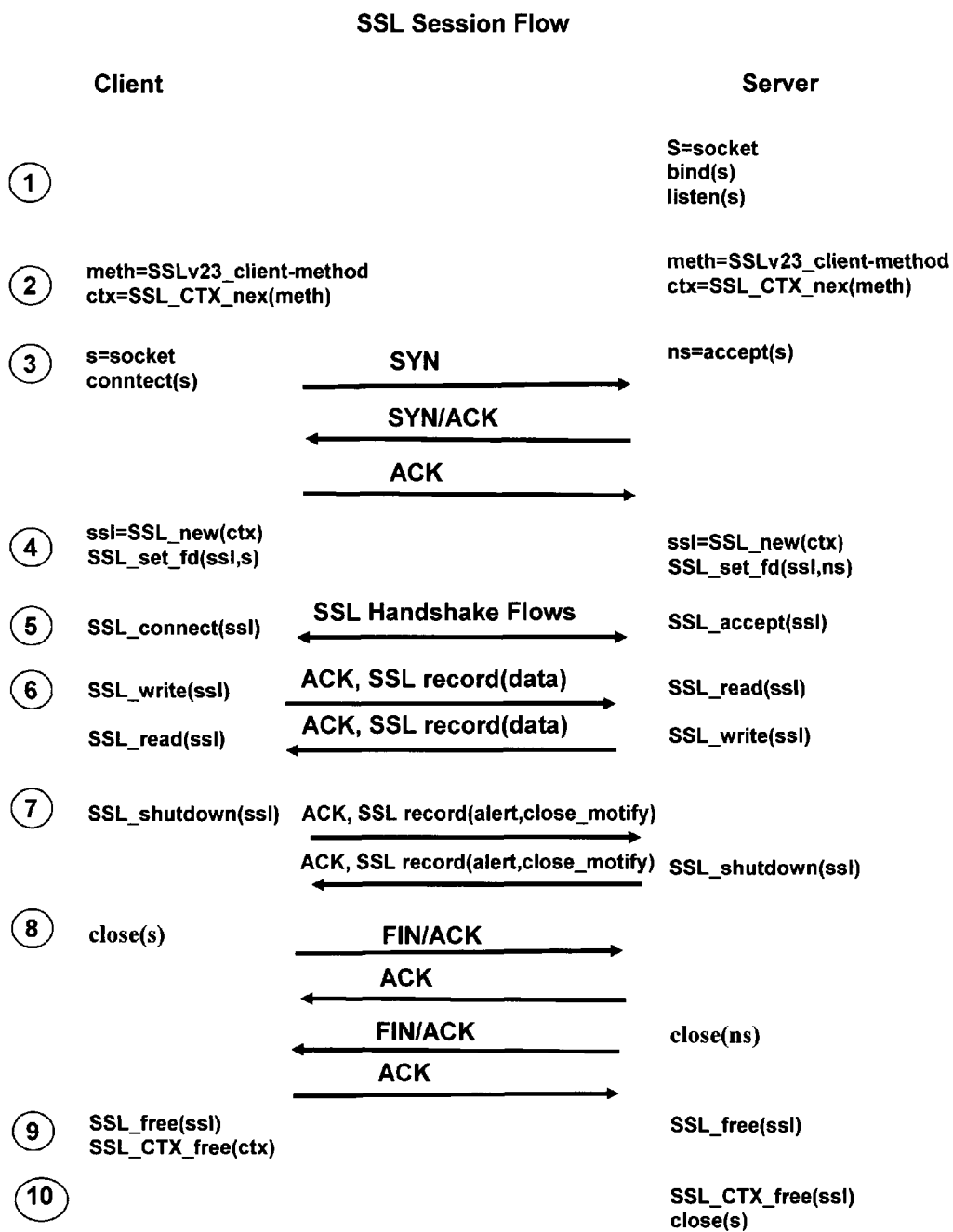
FIG. 5 is an SSL Session Flow.
Figure 6:
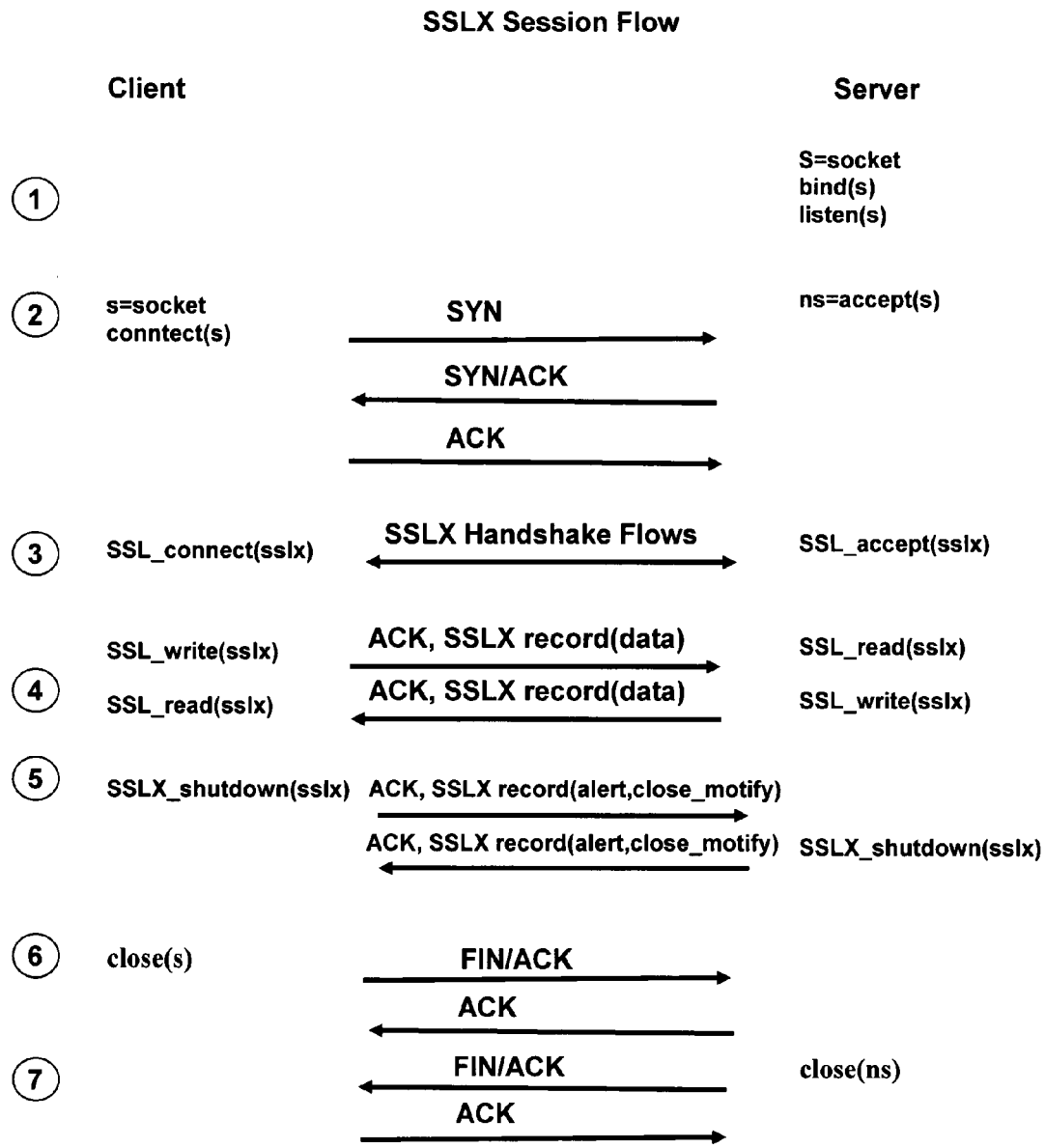
FIG. 6 is the SSLX Session Flow according to yet another aspect of the present invention.

The SSLX Session Flow follows a general TCP session flow, and SSLX uses different call syntax; e.g., see FIGS. 5 and 6. In SSLX there is no certificate and AES is the cipher module. Step 2, 9 and 10 of the SSL flow, therefore, are not necessary.

Steps 5 and 6 are the 'normal operation' of SSL, which are replaced by Steps 3 and 4 in SSLX—using a handshake to define a session key (message key), and then encrypting the contents to send back and forth between the browser and the server. The main distinction is that in SSL authentication only occurs once—in the handshake. In an SSLX session, step 4 includes an authenticated SSLX-EA key exchange once every session, which can be defined as short as every transmission.

Figure 7:
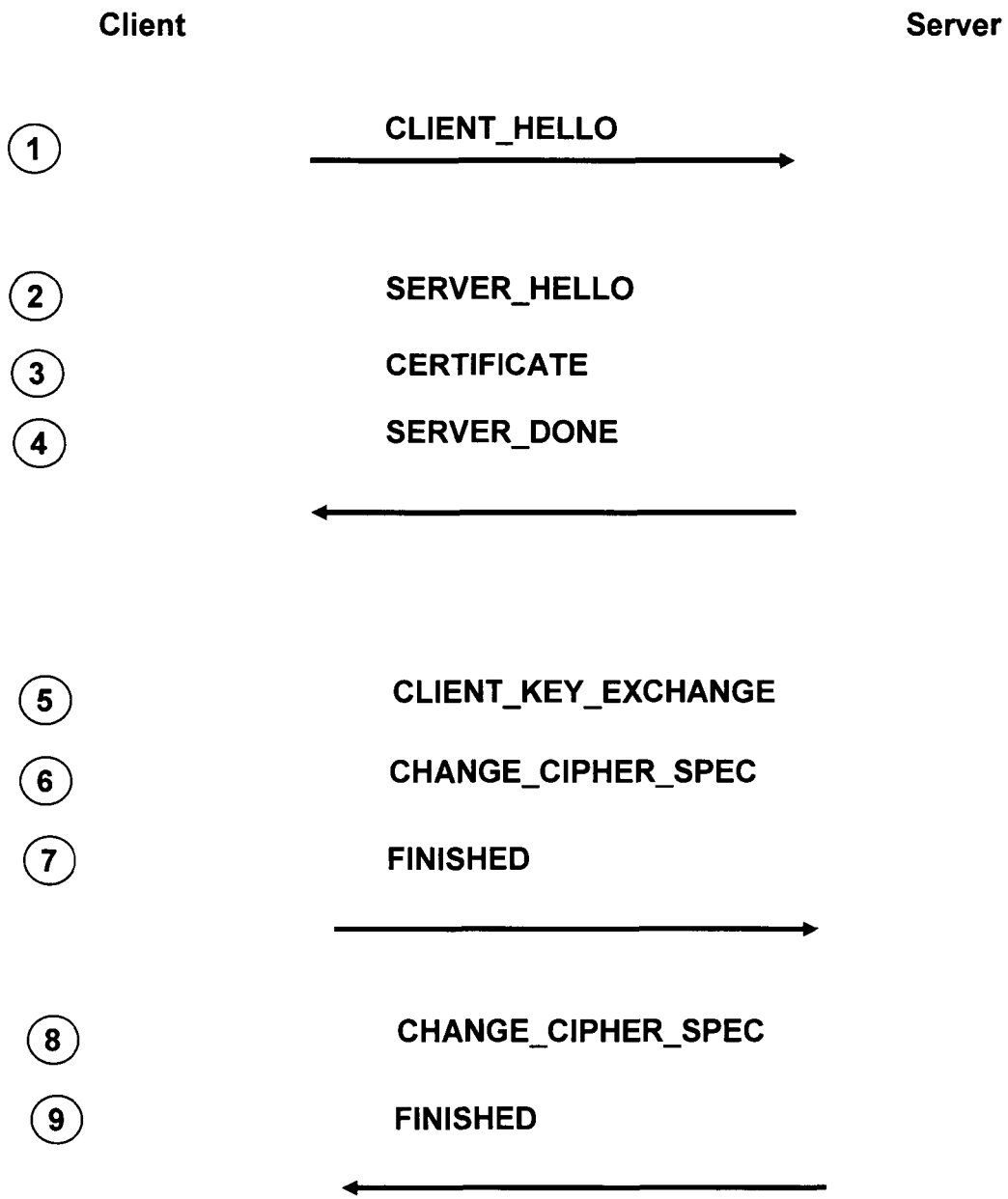
FIG. 7 is an SSL Handshake Flow for a New Session.
Figure 8:
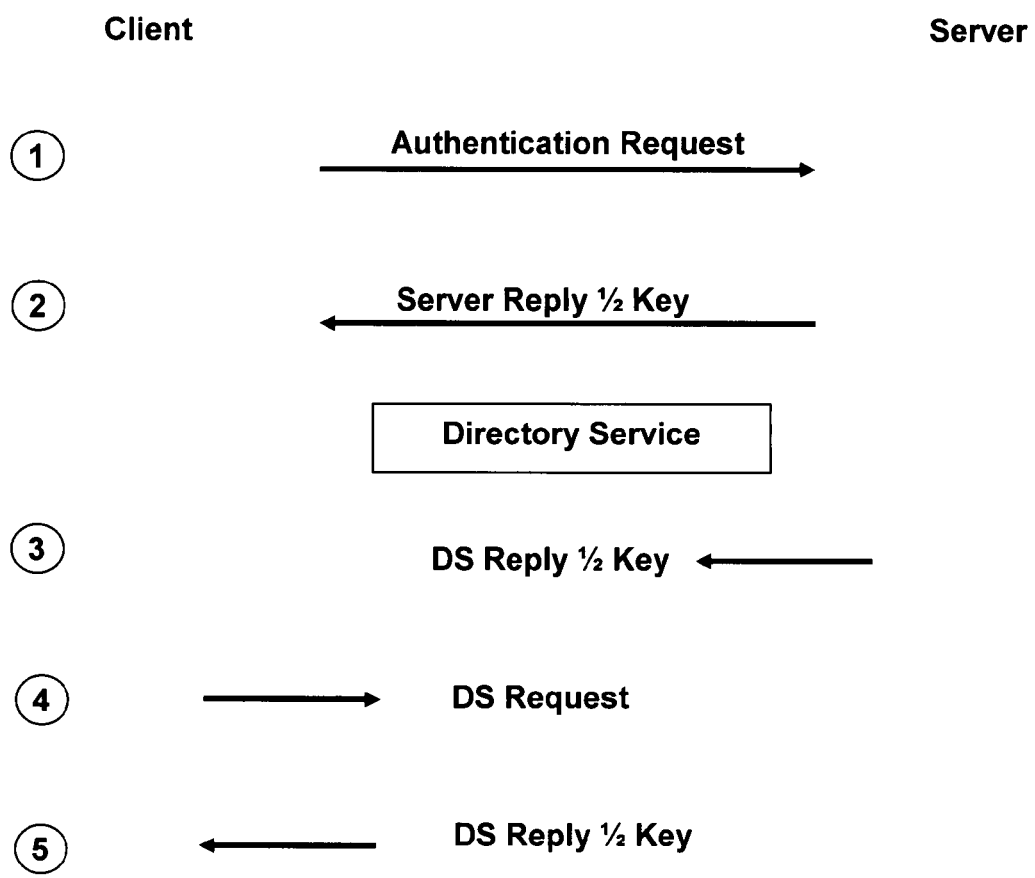
FIG. 8 is the SSLX Handshake Flow for a New Session according to still another aspect of the present invention.

In comparing the SSL and SSLX Handshakes FIGS. 7 and 8, the SSLX version has fewer steps and less computational requirement. In SSL, there is a version of the handshake that includes a browser certificate, and that makes the already complicated handshake even more so.

Step 3 in the SSL handshake is very computationally expensive: a digest of the signed messages in the Hello sequence is calculated to compare with the browser submitted digest. The amount of information passed in these digests and certificates is also considerable (upwards of 3 KB). In comparison, the SSLX calculations are less than 10% of the computational effort and bandwidth requirement (256-bits).

Figure 9:
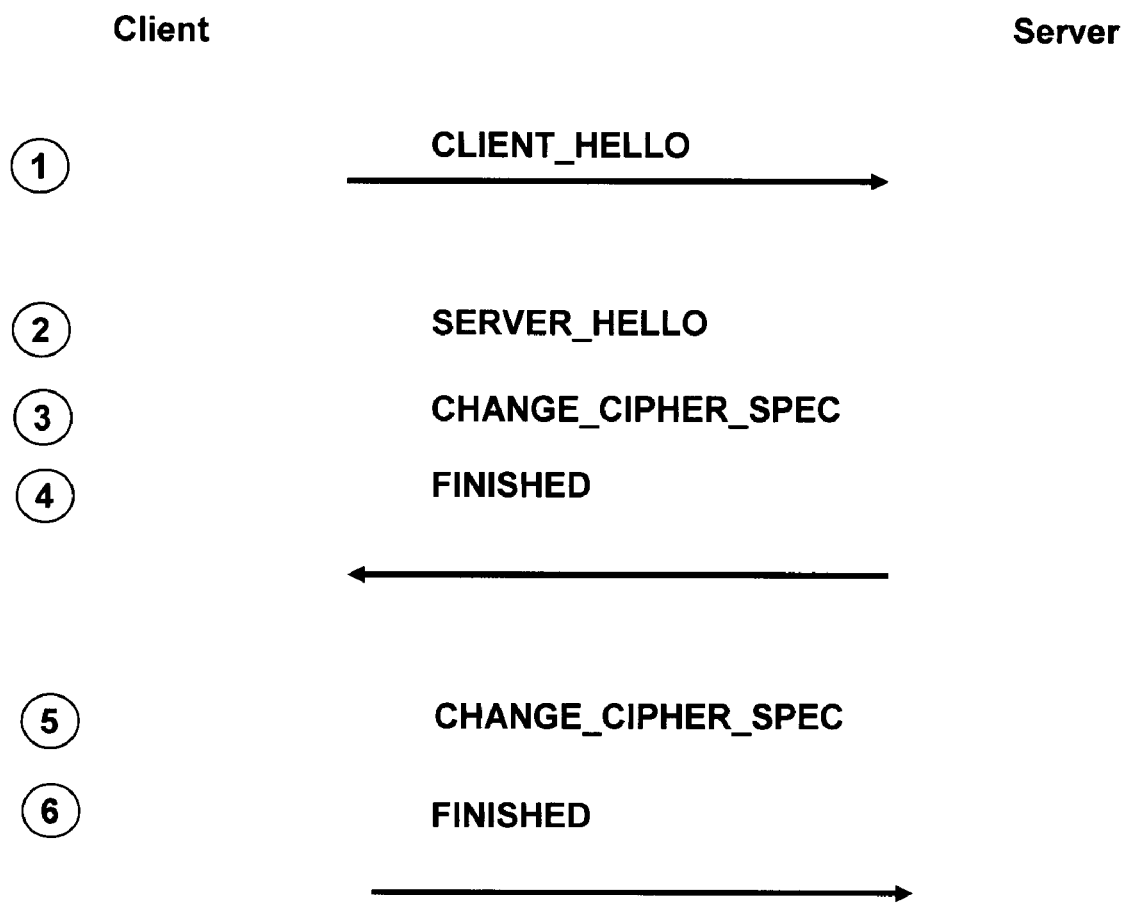
FIG. 9 is an SSL Handshake Flow for a Resumed Session.
Figure 10:
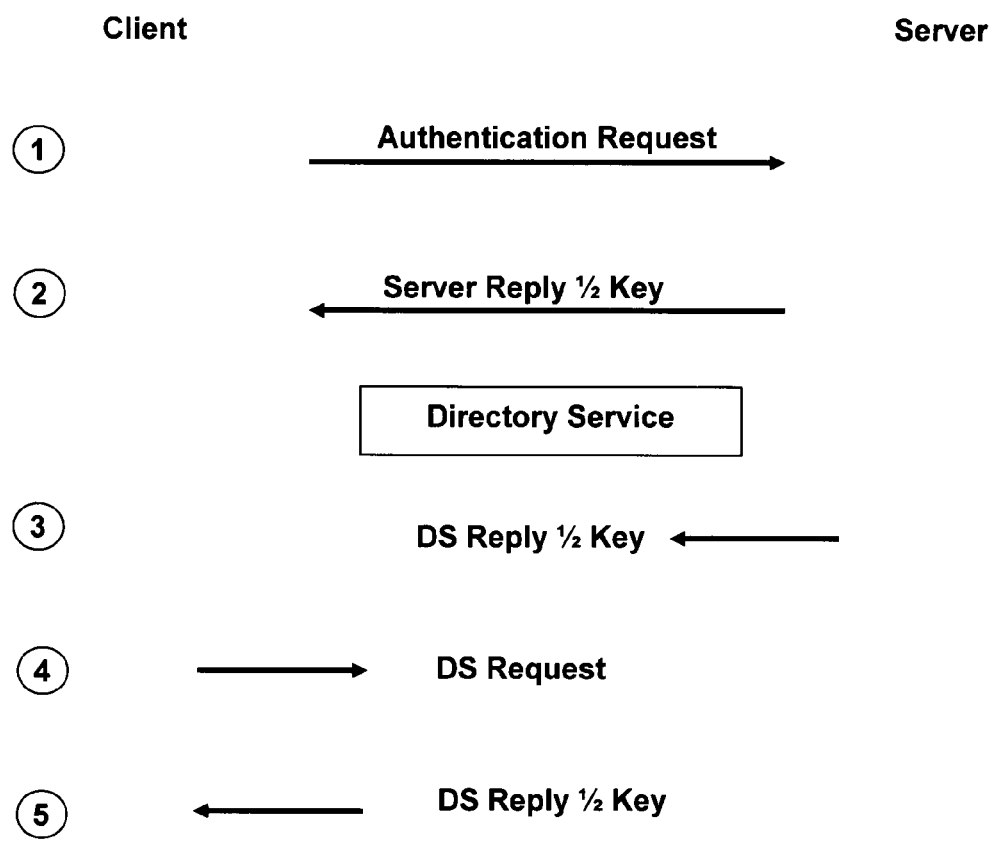
FIG. 10 is the SSLX Handshake Flow for a New Session according to yet another aspect of the present invention.

The last SSL session flow is the resumed session handshake, FIG. 9. In SSL, this entails both the browser and the server caching the last SSL information to shorten the interaction; and the reason for it is because a new handshake requires so much computational effort. SSLX does not need to replicate this flow, because even a resumed session SSL handshake takes more effort than a simple new SSLX Authentication Handshake—and the security of the two can't compare; see FIG. 10. The SSL resumed session handshake caches are a very serious security liability, whereas a new SSLX Authentication Handshake is not.

Data Element Definitions and Glossary

SSLX-EA Session Master Key (SMK)—A SSLX-EA 256-bit K1 key value used between a browser and a server (See SSLX-EA for details).

OpenID—Analogous to a Session ID; an open random 16-digit hex number assigned either per session or long term (used to identify browser and server components).

Key Distribution Center (KDC)—A data store of SSLX-EA keys, defined at minimum to retain the OpenIDs and associated SSLX-EA SMKs.

HTTPX://—The SSLX protocol.

Authentication Handshake (AH)—The method by which a browser may check and validate (verify) the identity of a web site (server). This process establishes the secure communications channel for browsers and servers who are 'unknown' to each other.

Normal Operation (Trusted)—The process by which a browser and server communicate securely after having established a trusted, keyed relationship (either by an AH or by an out-of-band distribution of SSLX keys).

Authentication Request (AR)—The start of an Authentication Handshake, sent from a browser to a web site server. It contains several pieces of information, some optional, including the SSF, a browser-generated public key, a Directory Service/Server's ID, etc.

Security Setting Flag (SSF)—A code value sent inside an AR that indicates the browser's configuration set security level for Authentication Handshakes (High, Medium, Low). There are different options for each SSF code, indicating the reply method from both the server and the DS.

Verified Set Up (VSU)—The process by which a browser and server validate (verify) their electronic identity to a Directory Service/Server (DS) for trusted third-party verification. This is one-time only action, which may be performed at multiple DSs, as well as reset at any DS already verified. Each server must perform at least one VSU to any public DS or the CDS; browsers may perform this process if desired.

Verified Set Up Request (VSUR)—The initial TCP request from a browser or web server that initiates the VSU process to a particular DS.

Directory Service/Server (DS)—A public entity that acts as a trusted switch by which browsers can verify the identity (and therefore trust) a web server. There can be any number of DSs, maintained and allocated by the SSLX Public Administrator.

DS Request (DSR)—The initial TCP request sent by a browser to a DS that completes an Authentication Handshake (AH).

DS Flag code (DSF)—A code value sent inside a VSUR that indicates the browser's configuration set security level for VSU processing (High, Medium, Low). There are different options for each DSF code, indicating the reply method from the DS.

DS Key (DSK)—A SSLX-EA 256-bit K1 key value used between a browser or server and a DS (obtained during a VSU).

SSLX Public Administrator (PA)—An independent governor of all the DSs, maintaining the list of public DSs as well as the policies and procedures for DS adherence.

What is claimed is:

1. A method for secure communication by a processor with a server comprising:
generating an encrypted message to the server by employing a one pass key generation probabilistic authentication process using a predetermined session master key;
said one pass key generation probabilistic authentication process including:
combining a plurality of selected digits of a random number with a plurality of selected digits of the predetermined session master key to form an alphabet, wherein said combining includes:
using a plurality of successive digits of the random number as a plurality of pointers into the predetermined session master key to select the plurality of selected digits in the predetermined session master key; and
using a plurality of successive digits of the predetermined session master key as a plurality of pointers into the random number to select the plurality of selected digits in the random number;
extracting a message key from the alphabet by using successive digits of the predetermined session master key as a plurality of pointers into the alphabet to select a plurality of digits of the alphabet to form the message key digits; and
encrypting the message using the message key; and
sending the encrypted message to the server along with the random number in unencrypted form.

2. The method according to claim 1, wherein said combining further comprises performing a hexadecimal add without carry operation on each of the plurality of selected digits of the random number with each of the plurality selected digits of the predetermined session master key to form the alphabet.

3. The method according to claim 1, further comprising: receiving a reply from the server, which reply includes a second random number.

4. The method according to claim 3, wherein said reply was generated by the server by employing said one pass key generation probabilistic authentication process using a predetermined session master key and the second random number.

5. The method according to claim 3, further comprising: generating a message key to decrypt the reply using the second random number and a same predetermined session master key used by the server to create the reply.

6. The method according to claim 1, wherein said generating and sending steps are performed even after an initial authentication process involving the processor and server.

7. A method for secure communication by a processor with a server comprising:
generating a message key from a random number and a master key by a one pass key generation probabilistic authentication process;
said one pass key generation probabilistic authentication process including:
combining a plurality of selected digits of the random number with a plurality of selected digits of the master key to form an alphabet, wherein said combining includes:
using a plurality of successive digits of the random number as a plurality of pointers into the master key to select the plurality of selected digits in the master key; and
using a plurality of successive digits of the master key as a plurality of pointers into the random number to select the plurality of selected digits in the random number; and
extracting the message key from the alphabet by using successive digits of the master key as a plurality of pointers into the alphabet to select a plurality of digits of the alphabet to form a plurality of digits of the message key; and
employing the message key to encrypt a request to the server.

8. The method according to claim 7, further comprising: sending an encrypted request and the random number to the server.

9. The method according to claim 7, wherein said combining further comprises performing a hexadecimal add without carry operation on each of the plurality of selected digits of the random number with each of the plurality selected digits of the master key to form the alphabet.

10. A method for secure communication between a computer and a web server comprising:
communicating securely with the web server by an application resident on the computer, said application:
participating in an initial authentication process with the server; and
wrapping every GET and POST request message to the server in an SSLX-EA exchange after the initial authentication process;
said SSLX-EA exchange including:
combining a plurality of selected digits of a random number with a plurality of selected digits of a first key to form an alphabet, wherein said combining includes:
using a plurality of successive digits of the random number as a plurality of pointers into the first key to select the plurality of selected digits in the first key; and
using a plurality of successive digits of the first key as a plurality of pointers into the random number to select the plurality of selected digits in the random number;
extracting a message key from the alphabet by using successive digits of the first key as a plurality of pointers into the alphabet to select a plurality of digits of the alphabet to form the message key digits; and said wrapping includes encrypting every GET and POST message using the message key and including the random number used to generate the message key along with the encrypted message in unencrypted form.

11. A method for secure communication between a computer and a web server comprising:
  communicating securely with the web server by an application resident on the computer, said application:
  participating in an initial authentication process with the server; and
  wrapping every GET and POST request message to the server in an SSLX-EA exchange after the initial authentication process, wherein a setting on the server is provided that defines an SSLX-EA session length, wherein one setting for an SSLX session length in a web architecture comprises one HTML page so that each page will have a unique session master key exchange and message key to include the request and reply of all objects on each page.

12. A method for secure communication between an application executable on a computer and a web server coupled to the computer comprising:
  participating by the application in an initial authentication process with the server; and
  wrapping every GET and POST request message to the server in an SSLX-EA exchange after the initial authentication process, wherein one setting for an SSLX session length in a web architecture comprises one HTML page so that each page will have a unique session master key exchange and message key to include the request and reply of all objects on each page.

13. A method for secure communication by a server with a processor comprising:
  generating an encrypted reply to the processor by employing a one pass key generation probabilistic authentication process using a predetermined session master key;
  said one pass key generation probabilistic authentication process including:
    combining a plurality of selected digits of a random number with a plurality of selected digits of the predetermined session master key to form an alphabet, wherein said combining includes:
      using a plurality of successive digits of the random number as a plurality of pointers into the predetermined session master key to select the plurality of selected digits in the predetermined session master key; and
      using a plurality of successive digits of the predetermined session master key as a plurality of pointers into the random number to select the plurality of selected digits in the random number;
    extracting a message key from the alphabet by using successive digits of the predetermined session master key as a plurality of pointers into the alphabet to select a plurality of digits of the alphabet to form the message key digits; and
    encrypting the reply using the message key; and
  sending the encrypted reply to the server along with said random number used to generated the message key in unencrypted form.

14. The method according to claim 13, wherein said reply includes the random number used by the server in the one pass key generation probabilistic authentication process.

15. The method according to claim 13, further comprising: receiving a request from the processor, which request includes a second random number.

16. The method according to claim 15, wherein said request was generated by the processor by employing said one pass key generation probabilistic authentication process using a predetermined session master key and the second random number.

17. The method according to claim 15, further comprising:
  generating a message key to decrypt the request using the second random number and a same predetermined session master key used by the processor to create the request.

18. The method according to claim 13, wherein said generating and sending steps are performed even after an initial authentication process involving the processor and server.

19. A method for secure communication by a server with a processor comprising:
  generating a message key from a random number and a master key by:
    combining a plurality of selected digits of the random number with a plurality of selected digits of the master key to form an alphabet, wherein said combining includes:
      using a plurality of successive digits of the random number as a plurality of pointers into the master key to select the plurality of selected digits in the master key;
      using a plurality of successive digits of the master key as a plurality of pointers into the random number to select the plurality of selected digits in the random number;
    extracting a message key from the alphabet by using successive digits of the master key as a plurality of pointers into the alphabet to select a plurality of digits of the alphabet to form the message key digits; and
  employing the message key to encrypt a reply to the processor.

20. The method according to claim 19, further comprising: sending an encrypted reply and the random number to the processor.

21. A method for secure communication between a computer and a web server comprising:
  communicating securely with an application resident on the computer by the web server, said web server:
  participating in an initial authentication process with the application; and
  wrapping every reply to every received GET and POST request message from the application in an SSLX-EA exchange after the initial authentication process;
  said SSLX-EA exchange including:
    combining a plurality of selected digits of a random number with a plurality of selected digits of a master key to form an alphabet, wherein said combining includes:
      using a plurality of successive digits of the random number as a plurality of pointers into the master key to select the plurality of selected digits in the master key;
      using a plurality of successive digits of the master key as a plurality of pointers into the random number to select the plurality of selected digits in the random number;
    extracting a message key from the alphabet by using successive digits of the master key as a plurality of pointers into the alphabet to select a plurality of digits of the alphabet to form the message key digits; and
    encrypting the reply and sending the encrypted reply along with the random number in unencrypted form.

22. A method for secure communication between a computer and a web server comprising:
- communicating securely by the web server with an application resident on the computer, said web server:
- participating by the server in an initial authentication process with the application; and
- wrapping every reply to every received GET and POST request message from the application in an SSLX-EA exchange after the initial authentication process, wherein a setting on the server is provided that defines an SSLX-EA session length, wherein one setting for an SSLX session length in a web architecture comprises one HTML page so that each page will have a unique session master key exchange and message key to include the request and reply of all objects on each page.

23. A method for communicating between a processor and a server comprising:
- communicating securely with the server by a program resident on the processor;
- performing an initial authentication process of authenticating the server to the program and authenticating the program to the server; and
- authenticating and encrypting each message between the server and the program after performing the initial authentication process;
- said encrypting by:
  - combining a plurality of selected digits of a random number with a plurality of selected digits of a master key to form an alphabet, wherein said combining includes:
    - using a plurality of successive digits of the random number as a plurality of pointers into the master key to select the plurality of selected digits in the master key;
    - using a plurality of successive digits of the master key as a plurality of pointers into the random number to select the plurality of selected digits in the random number;
  - extracting a message key from the alphabet by using successive digits of the master key as a plurality of pointers into the alphabet to select a plurality of digits of the alphabet to form the message key digits; and
  - encrypting the message using the message key.

24. The method according to claim 23, wherein said authenticating and encrypting includes employing a one pass key generation probabilistic authentication process to create every GET and POST request message from the program to the server using a predetermined session master key and a unique random number included with every GET and POST request message.

25. The method according to claim 23, wherein said authenticating and encrypting includes employing a one pass key generation probabilistic authentication process to create every reply from the server using a predetermined session master key and a unique random number included with every reply.

26. A method for communicating between a computer and a server comprising:
- during each session of communication between the computer and the server:
  - wrapping each request by the computer in an SSLX-EA key exchange and cipher text at a start of the session and sending each wrapped request to the server; and
  - wrapping each request by the computer in cipher text only if not at the start of a session and sending each wrapped request to the server;
- said wrapping each request in an SSLX-EA key exchange including:
- encrypting each request by:
  - combining a plurality of selected digits of a random number with a plurality of selected digits of a first key to form an alphabet, wherein said combining includes:
    - using a plurality of successive digits of the random number as a plurality of pointers into the first key to select the plurality of selected digits in the first key;
    - using a plurality of successive digits of the first key as a plurality of pointers into the random number to select the plurality of selected digits in the random number;
  - extracting a message key from the alphabet by using successive digits of the first key as a plurality of pointers into the alphabet to select a plurality of digits of the alphabet to form the message key digits; and
  - encrypting the request using the message key and transmitting the random number in unencrypted form with the encrypted request.

27. The method according to claim 26, further comprising:
- unwrapping by the server the SSLX-EA key exchange and decrypting the request if at the start of the session; and
- decrypting the request only by the server if not at the start of the session.

28. A method for communicating between a computer and a server comprising:
- during each session of communication between the computer and the server:
  - wrapping each request by the computer in an SSLX-EA key exchange and cipher text at a start of the session and sending each wrapped request to the server; and
  - wrapping each request by the computer in cipher text only if not at the start of a session and sending each wrapped request to the server, further comprising:
  - wrapping by the server a reply in an SSLX-EA key exchange if a session length is set for every communication;
  - wrapping by the server the reply in cipher text only using the session key if the session length has not been exceeded; and
  - returning the reply by the server to the computer.

29. A method for communicating between a computer and a server comprising:
- during each session of communication between the computer and the server:
  - wrapping each request by the computer in an SSLX-EA key exchange and cipher text at a start of the session and sending each wrapped request to the server; and
  - wrapping each request by the computer in cipher text only if not at the start of a session and sending each wrapped request to the server, further comprising:
  - unwrapping by the computer the reply and performing an SSLX-EA key exchange decrypt or a cipher decrypt only based on the session length setting.

* * * * *